US011402972B2

(12) United States Patent
Circlaeys et al.

(10) Patent No.: US 11,402,972 B2
(45) Date of Patent: Aug. 2, 2022

(54) CURATED MEDIA LIBRARY

(71) Applicant: Apple Inc., Cupertino, CA (US)

(72) Inventors: Eric Circlaeys, Los Gatos, CA (US); Guillaume Vergnaud, Tokyo (JP); Samantha E. Fierro, Carlsbad, CA (US); Kevin Aujoulet, San Francisco, CA (US); Benedikt M. Hirmer, San Francisco, CA (US); Alexandre N. Lopoukhine, San Francisco, CA (US); Kevin Bessiere, Cupertino, CA (US); Vignesh Jagadeesh, San Jose, CA (US); Rohan Chandra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 16/560,104

(22) Filed: Sep. 4, 2019

(65) Prior Publication Data

US 2020/0356227 A1 Nov. 12, 2020

Related U.S. Application Data

(60) Provisional application No. 62/844,050, filed on May 6, 2019.

(51) Int. Cl.
*G06F 3/0484* (2022.01)
*G06F 3/0482* (2013.01)
*G06F 3/0485* (2022.01)
*G06F 16/44* (2019.01)

(52) U.S. Cl.
CPC ......... *G06F 3/0484* (2013.01); *G06F 3/0482* (2013.01); *G06F 3/0485* (2013.01); *G06F 16/447* (2019.01)

(58) Field of Classification Search
None
See application file for complete search history.

(56) References Cited

U.S. PATENT DOCUMENTS

| | | | | |
|---|---|---|---|---|
| 6,486,896 B1 * | 11/2002 | Ubillos | ............... | G06F 3/04855 715/784 |
| 2005/0010955 A1 * | 1/2005 | Elia | ........................ | G06F 3/0482 725/88 |
| 2006/0224993 A1 * | 10/2006 | Wong | ...................... | G06F 16/54 715/800 |
| 2008/0163059 A1 * | 7/2008 | Craner | ............... | H04N 21/4316 715/719 |
| 2009/0049400 A1 | 2/2009 | Ishihara et al. | | |
| 2012/0082401 A1 * | 4/2012 | Berger | ............... | G06F 16/5866 382/306 |
| 2012/0324401 A1 | 12/2012 | Morris | | |

(Continued)

*Primary Examiner* — Cesar B Paula
*Assistant Examiner* — John M Heffington
(74) *Attorney, Agent, or Firm* — Invoke

(57) ABSTRACT

In some implementations, a computing device may generate a day view, month views, and year view that show cards specific to each view. The cards include images, videos, and/or other assets from a media library that reflect a corresponding time frame of the card on which the assets are displayed. A selected view is presented in a graphical user interface (GUI) for interaction with a user of the media library. Upon selection of an asset displayed to the GUI, the view is switched to show more assets from a time frame similar to the selected asset while maintaining a focus on the selected asset.

16 Claims, 15 Drawing Sheets

(56) References Cited

U.S. PATENT DOCUMENTS

| | | | | |
|---|---|---|---|---|
| 2014/0101174 A1* | 4/2014 | Tsai | ................ | G06F 16/447 |
| | | | | 707/752 |
| 2015/0012537 A1* | 1/2015 | Yi | ................ | G06F 16/285 |
| | | | | 707/737 |
| 2016/0110046 A1* | 4/2016 | Yao | ................ | G06F 3/0488 |
| | | | | 715/784 |
| 2018/0181281 A1* | 6/2018 | Suki | ................ | G06F 3/0485 |

* cited by examiner

CURATED MEDIA LIBRARY

TECHNICAL FIELD

The disclosure generally relates to selecting and displaying images of a media library, and more particularly, to curating the media library to select and arrange interesting images to display.

BACKGROUND

Conventional media libraries display all images and videos contained therein in one or more interfaces. The pictures and videos may be sorted according to a sorting parameter, such as a time of capture, alphabetically by filename, etc. However, for large media libraries that include hundreds or thousands of images and videos, such a presentation may be too cumbersome for a user to manage, too slow to load, and too burdensome for the user to navigate in order to view desired images and videos. These experiences may lead to the user choosing to not visit the media library or interact with images and videos stored to the media library, which may reduce the use of already-captured images and videos, along with a reduced desire to capture more pictures and videos in the future.

SUMMARY

In some implementations, a computing device may generate a day view, month views, and year view that show cards specific to each view. The cards include images, videos, and/or other assets from a media library that reflect a corresponding time frame of the card on which the assets are displayed. A selected view is presented in a graphical user interface (GUI) for interaction with a user of the media library. Upon selection of an asset displayed to the GUI, the view is switched to show more assets from a time frame similar to the selected asset while maintaining a focus on the selected asset.

Particular implementations provide at least the following advantages. A large media library may include hundreds or thousands of distinct images, videos, and other assets. When a user attempts to navigate through a large media library, it may be difficult to locate desired assets in a timely and intuitive manner. The curated media library presents key assets that are most likely to be sought after by the user based on a variety of factors, and shows these key assets in a series of views that may be quickly and intuitively switched between by the user to show more assets like the key asset when desired, or allow a time frame to be changed quickly by the user to look for other assets at different time periods.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
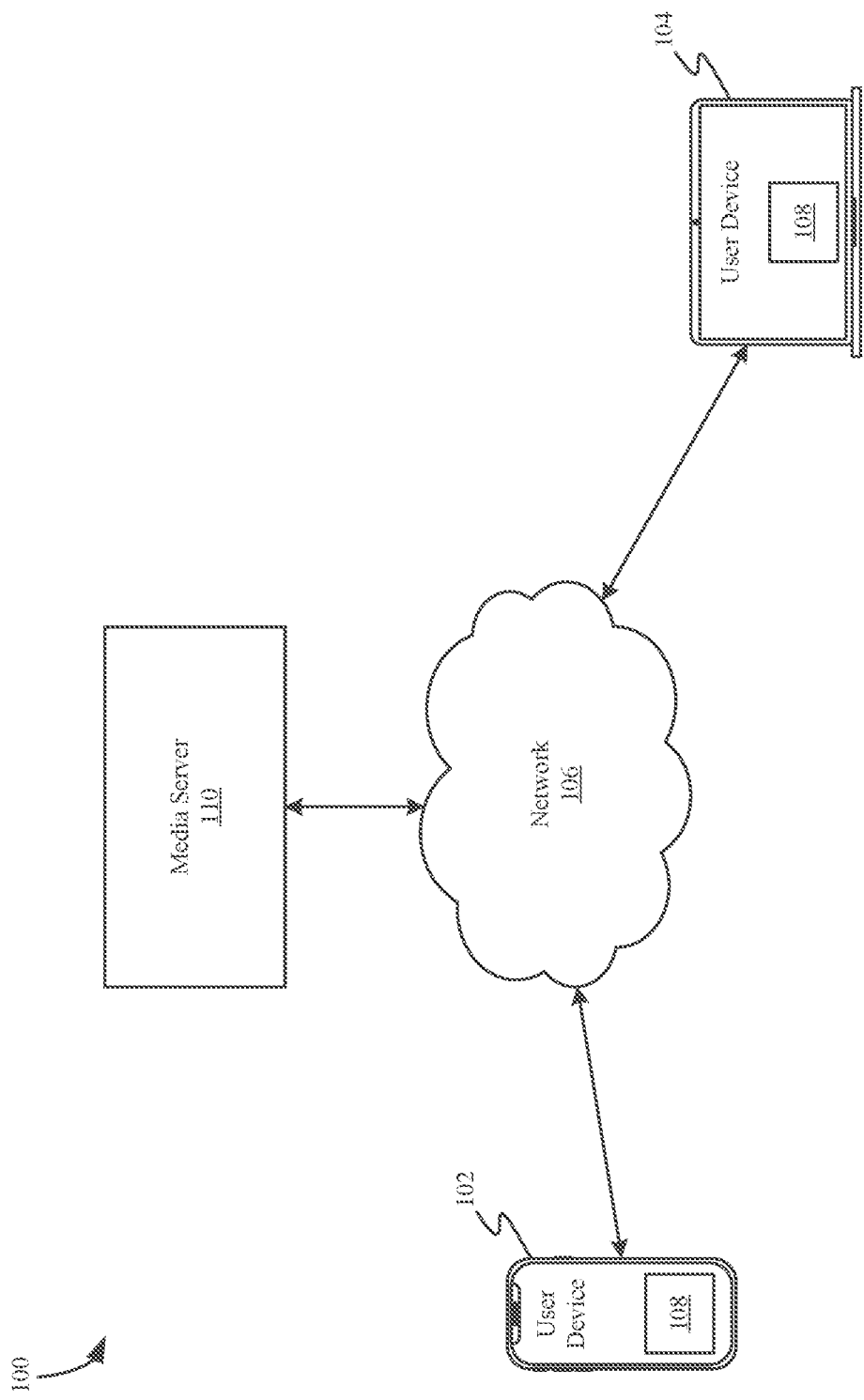
FIG. 1 is a block diagram of an example system for providing a curated media library.

Many users have accumulated large media libraries since the advent of digital cameras, and more particularly, the incorporation of digital cameras into mobile devices, such as smart phones and other electronic devices that are easily transportable by a user. Media assets include digital photos and images, videos, animated images, composite presentations and compilations, etc. A large media library may include multiple hundreds and even thousands of individual images and videos that have been collected over years by one or more users, and stored to one or more locations. When a user attempts to access and manage a large media library, there may be many issues associated with the vast quantity of images and videos included therein, such as difficulty in locating a desired image or video within the numerous assets stored to the media library, slow loading times for the individual assets, slow response times for user interactions with the media library (such as scrolling through the images and videos, selecting a particular image to display, transitioning between display types, etc.), etc.

Therefore, it is beneficial for the images, videos, and other assets within any size of media library to be curated such that the best images, videos, and other assets are more easily viewed and accessed by a user. Furthermore, in some approaches, images and videos which are not likely to be sought by the user may be filtered out from most views of the media library. Embodiments described herein provide an enhanced user experience to view and access the media library that promotes the best images, videos, and other assets.

In one example, assume that a user of a smartphone, named Mary, has pictures and videos of her children and family saved to her smartphone, along with even more images, videos, and composite presentations stored to a remote cloud server that are accessible on her smartphone. Assume that Trevor, Mary's son is celebrating his birthday tomorrow, and Mary wants to find a photo that she took of Trevor's third birthday party back in 2013. Further assume that at this birthday party, Mary captured three photos and a video from the party: one photo of kids playing that is blurry, one photo of Trevor smiling broadly next to his birthday cake, one photo of the receipt for the cake so that Mary could pay back her mother for buying the cake, and a video of Trevor opening gifts. Mary really likes the photo of Trevor smiling with his birthday cake, but is not interested in the blurry photo or the photo of the receipt for the cake. Mary also likes the video, but not as much as the photo of Trevor smiling with his birthday cake, and over the years Mary has returned often to view this particular photo.

Using conventional media libraries that are sorted chronologically, she may need to navigate the media library manually starting from the most recent photos and videos taken, backward through all of her images and videos taken in all the years from now, through 2014, to arrive at 2013. Then, Mary may need to navigate through all the photos taken in 2013 to locate the exact photo from Trevor's birthday party that she is looking for from amongst all other photos taken and stored from the year 2013. This may be a very time consuming and frustrating procedure for Mary to locate the exact photo she wants, and may cause her to abandon the effort before obtaining the photo of Trevor's third birthday party. If the media library was able to anticipate her desire to find the photo of Trevor smiling with his birthday cake from Trevor's third birthday party, without Mary needing to perform a search for the photo, her task would be completed faster and she may find more enjoyment in using the media library.

FIG. 1 is a block diagram of an example system 100 for providing a curated media library. System 100 may include multiple user devices, e.g., smartphone 102, laptop 104, etc. Each user devices 102, 104 may include a media library application 108 that is configured to display assets accessible to the particular user device on which the media library application 108 is executed, such as assets stored locally to the user device. Moreover, in one example, any of the various user devices 102, 104 may be configured to connect to a media server 110 to allow the media library application 108 to access additional assets that are stored remotely to media server 110 (and may not be local to the particular user device). In one approach, the media library application 108 may display remotely-stored and/or locally-stored assets in a graphical user interface (GUI) on user devices 102, 104.

Any type of user device (including those not specifically shown in FIG. 1) may be included in system 100, such as desktop computers, media devices like set-top boxes (STBs), mobile phones, digital streaming devices, smart televisions (TVs), tablet computers, wearable devices, etc.

Media library application 108 may be configured to present a media library via user devices 102, 104. The media library, although not shown, may be configured to present a plurality of assets to a user interacting with the media library. Any type of asset may be shown in the media library, such as images, photos, videos, animated images, composite presentations, etc., as described in more detail in FIGS. 2-9.

An image, as used herein, describes any type of digitally stored viewable content, such as static animation, a logo, a cartoon, artwork, etc. A photo as used herein describes a digital representation of real-world imagery that was captured using a digital camera device.

An animated image, as used herein, describes a container or other file format that includes a series of images that are manipulated or processed to appear as a coherent moving image when opened or played. Some example animated images include, but are not limited to, graphics interchange format (GIF) files, portable network graphics (PNG) files, multiple-image network graphics (MNG) files, Live Photos™, etc.

A composite presentation, as used herein, describes an arrangement of media assets, such as images and/or videos, that are selected according to a theme or purpose, and may be set to audio or music. For example, a composite presentation may be directed to a weekend ski trip, and may include videos and photos from the ski trip, such as pictures of family members surrounding a firepit drinking hot cocoa followed by an image of the ski resort, photos of a child wearing ski clothing, and then videos of family members skiing down the slopes. Of course, the order of the assets, the music and other audio played, titles, text or audio descriptions, etc., may be set or modified, as desired by a user of the media library.

Referring again to FIG. 1, in one approach, user devices 102, 104 may utilize a network 106 to access media server 110, or any other remotely accessible data source. Any type of network 106 may be utilized, such as the Internet, wide area network (WAN), local area network (LAN), wireless local area network (WLAN), virtual private network (VPN), mobile broadband network, etc. Moreover, in an approach, more than one network may be used to connect a user device 102, 104 to any other system, device, or network.

Media server 110 may be any type of system or device that is configured to store assets, and provide access to and/or transfer such assets to a requesting user device 102, 104. In one example, media server 110 may be a cloud server that hosts images, videos, and other assets so that they may be accessed, on demand, by user devices 102, 104. In a further approach, the media applications 108 may be client applications that rely on the media server 110 to provide instructions and/or assets for display on the user devices 102, 104.

Returning to the example of Mary, she may use mobile phone 102 to access a media library via media library application 108 to search for the photo of Trevor and his birthday cake from his third birthday party. If the photo is not stored locally to mobile phone 102, then media library application 108 may access media server 110 (possibly via network 106) to search for, and ultimately obtain the desired photo using any of the various approaches described herein.

FIGS. 2-6B show different example views or cards that may be displayed within a GUI of a media library application. These various views may be used to display different levels of the media library to allow a user, such as Mary in the example above, to more easily locate and access an asset that is of interest to Mary, like the picture of Trevor and his birthday cake from his third birthday party. In addition, in one example, undesirable assets, like the blurry photo or the receipt photo may be hidden from most views so that the number of assets that Mary navigates through to find a desired asset is reduced, making the task easier for Mary.

Figure 2:
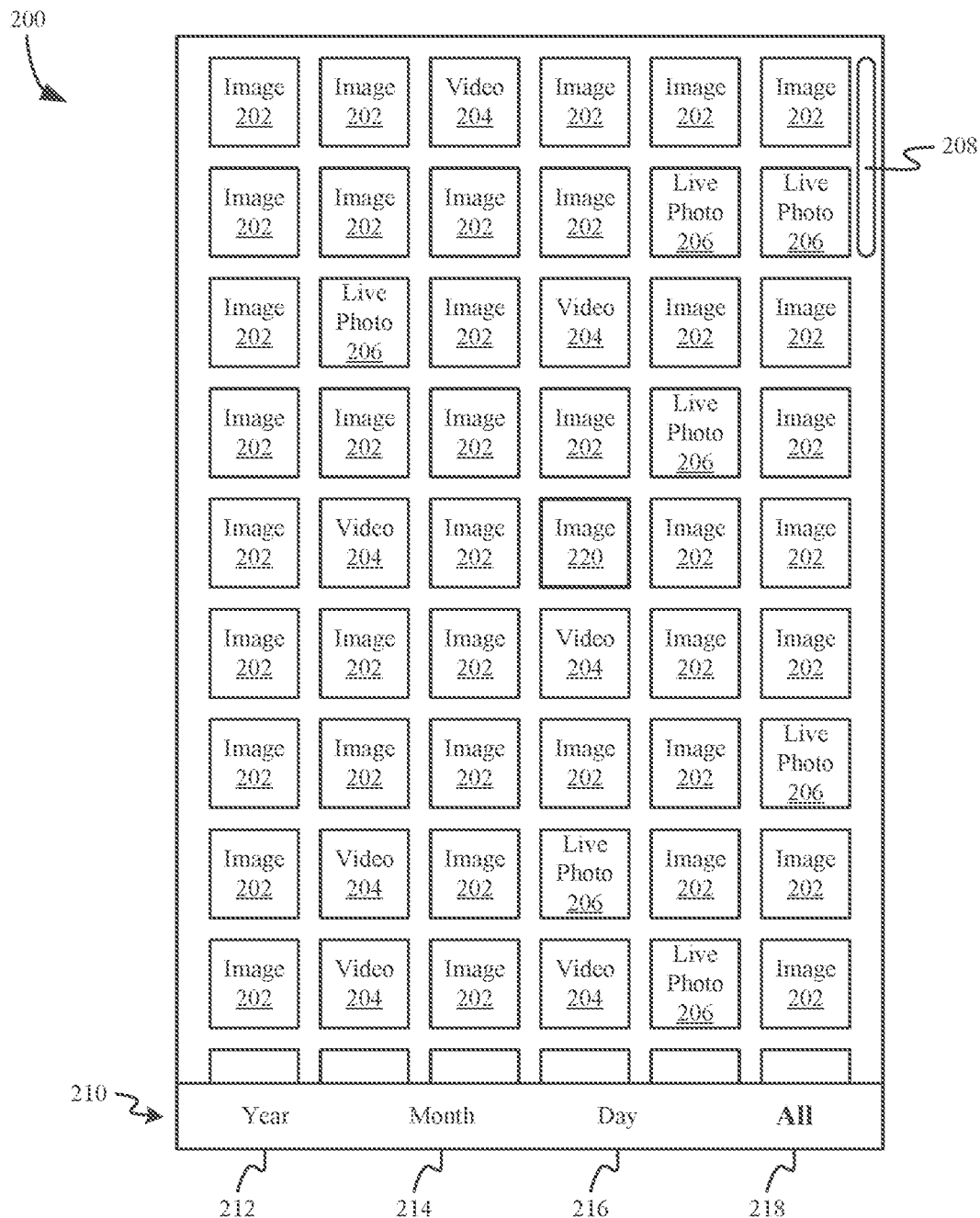
FIG. 2 shows an example all assets view of the media library application.

FIG. 2 shows an example all assets view 200 of the media library application. This view 200 may be used to display all assets of a media library, in one approach. All four of the assets captured during Trevor's third birthday party would appear in this view, for example. The assets may include still images 202, videos 204, animated images 206, or any other asset types, such as composite presentations, panoramic images, etc. As shown, only a portion of a plurality of assets that are stored to the media library are actually shown in all assets view 200 at any given time. This is because it is not possible to show all assets of a large media library in any functional way without utilizing a massive display, which is simply not available on most devices which are used to view the media library, e.g., mobile phones, laptop computers, etc.

The assets may be sorted chronologically in the media library, in an example. Other methods of sorting the assets may be employed in conjunction with or in place of chronological, such as alphabetically by name or title, by size, by curation score (as described later), by aesthetic score (as described later), etc. In addition, a scroll bar 208 may be provided to allow a user to scroll through the plurality of assets that may be displayed in all assets view 200, in an example. However, any type of mechanism that is able to navigate through the plurality of assets quickly and intuitively may be used, such as finger dragging on a touchscreen, up and down soft or hard key input, etc.

In all assets view 200, each of the assets is shown having substantially the same size, regardless of the type of asset in one approach. By substantially equal, what is meant is that each asset which is larger than the common frame size is scaled down to fit within the common frame of the all assets view 200, while assets which are smaller than the common frame size are centered within the common frame for display. In the example described above, the three photos and the video from Trevor's third birthday party may all appear having a same size.

In an example, a user may zoom in or zoom out while in all assets view 200. A user may provide zoom input to indicate a desired zoom level, such as by selecting one of a series of options (e.g., 10%, 25%, 50%, 75%, 90%, 100%, 150%, 250%, etc.), moving a slider icon on a slider bar, touch and drag input on a touchscreen display, etc. Zooming in increases a size of each asset, while zooming out decreases a size of each asset, with the increase or decrease being proportional to zoom input from the user.

In another approach, some of the assets shown in the all assets view 200 may have different sizes than other assets. The decision as to which assets to show more prominently (larger) may be based on several factors, as discussed in more detail later. In the example with Mary's photos, the blurry photo and the receipt photo may appear smaller than the photo of Trevor and his birthday cake and the video of opening gifts. In a further approach, because Mary likes the photo more than the video, the photo may appear larger than the video.

In an approach, all assets view 200 may include a ribbon element 210. The ribbon element 210 may include a set of selectable links or labels. For example, in FIG. 2, four labels are shown: Year label 212, Month label 214, Day label 216, and All label 218. All label 218 is shown highlighted, because the current view is all assets view 200. Any type of highlighting may be used to denote an active label, such as bold lettering, enlarged lettering, italicized lettering, a different background color surrounding the current label, different coloring for the current label, etc. Moreover, any name or image may be used to represent the different levels of the media library that are represented by the various labels, as would be appropriate for the specific labels chosen to navigate through the media library.

In FIG. 2, ribbon element 210 is shown positioned along a bottom of all assets view 200. However, ribbon element 210 may be positioned along a top of view 200, a side of view 200 (with vertical lettering in one example), or it may auto-hide and disappear when a user is not interacting with view 200 in some examples.

Each of the labels may be associated with a different type of card or view, so that when a particular label is selected, the view will change to display the associated card or view. For example, when Day label 216 is selected, the current view will transition to a day view, described in more detail in FIGS. 3-4. In another example, when Month label 214 is selected, the current view will transition to a month view, described in more detail in FIG. 5. According to another example, when Year label 212 is selected, the current view will transition to a year view, described in more detail in FIG. 6A.

In addition, a current focus of the current view will be maintained after the transition to the selected view. For example, in FIG. 2, if image 220 is a focus of view 200, indicated by the bold frame surrounding image 220, then image 220 will remain the focus of attention after transitioning to a day view by ensuring that a day or days that are shown in the day view include image 220 (in other words, a timestamp associated with image 220 occurs during a day that is shown in the day view transitioning to), e.g., if image 220 was taken on May 17, 2012, then the asset(s) shown in response to selecting Day label 216 will be taken on or around May 17, 2012.

The focus of a particular view or card may be indicated by a user selecting an asset within the view or card in one approach. This selection of the image may be indicated using a gesture or user input device, e.g., a mouse hover, mouse click, touch input on a touchscreen display, stylus input on a tablet, remote control, trackpad input on a laptop computer, etc.

In another approach, the focus of a particular view or card may be indicated by an image, video, or other asset that is currently displayed in a particular view. For example, if a user scrolls through assets of all assets view 200 and arrives at a portion of the plurality of assets that shows images captured on Jan. 6, 2017, then a transition to another view will maintain a focus on that date (e.g., a day view will show assets from Jan. 6, 2017, a moth view will show assets from January 2017, and a year view will show assets from 2017).

When multiple assets from different dates are shown on a current view when a transition to another view is requested, absent explicit user input selecting an asset to focus on, the media library application may determine that an asset located near a center of all currently-displayed assets is the focus of the current view, in one approach.

In another approach, a last user selected image may remain a focus of the particular view in the absence of a later selection.

Figure 3:
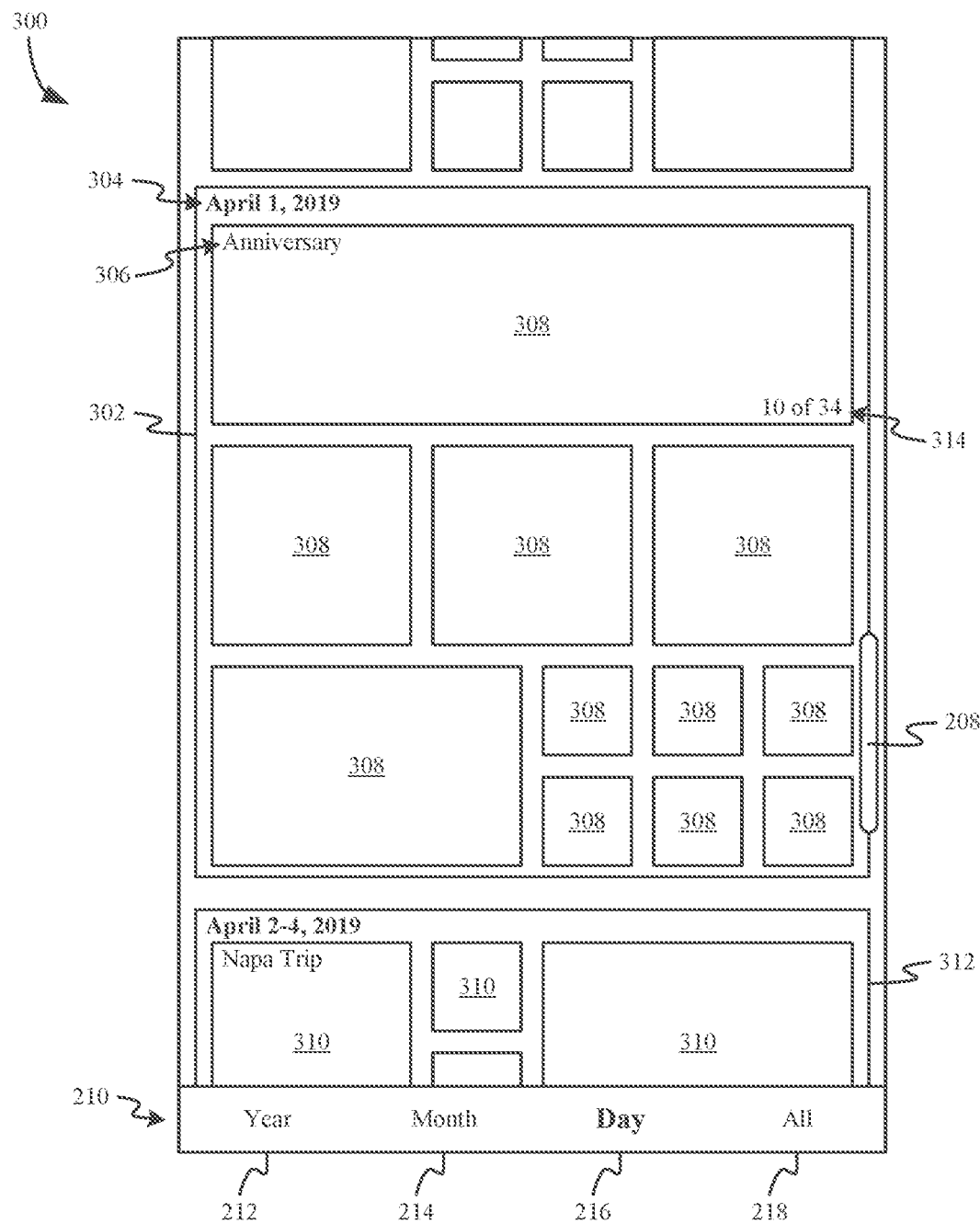
FIG. 3 shows an example day view of the media library application focusing on a day card.
Figure 10:
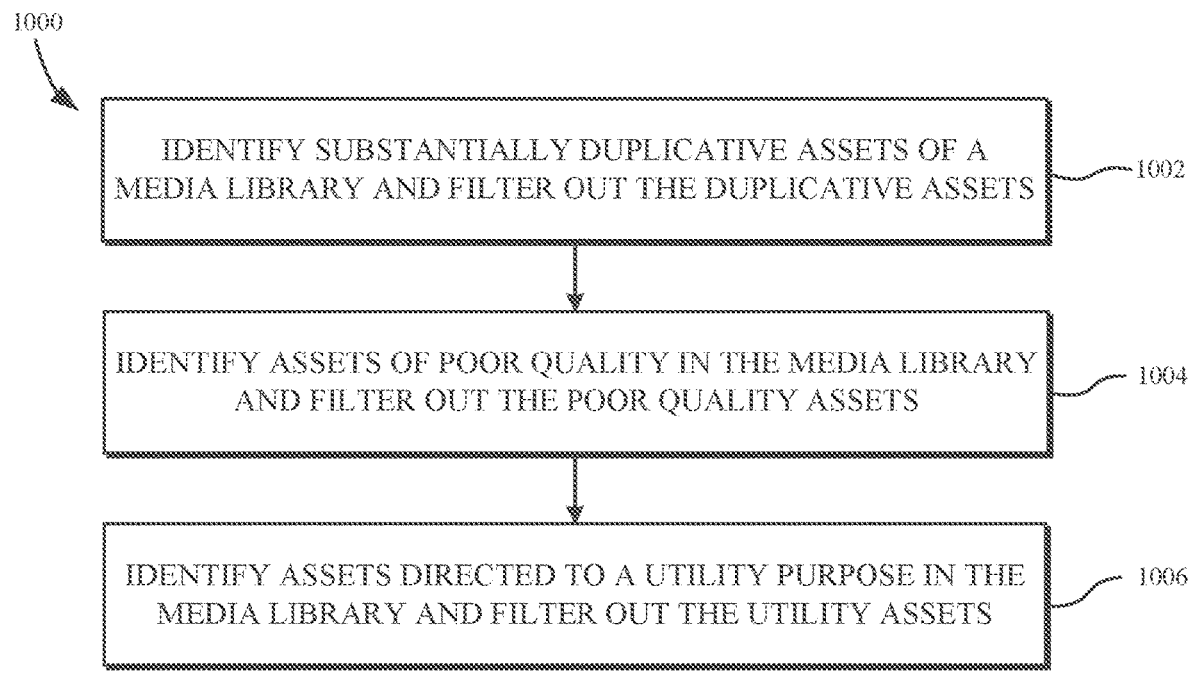
FIG. 10 is a flow diagram of an example process for curating assets of a media library.

FIG. 3 shows an example day view 300 of the media library application focusing on a day card 302. This view 300 may be used to display some or all assets associated with a particular day (Apr. 1, 2019 for example). In one approach, day view 300 displays curated assets 308 on a day card 302, and hides from view other assets associated with the particular day that are filtered out from the set of curated assets 308 presented on day card 302. FIG. 10 shows an example curation process that may be used in the context of determining which assets to display in day view 300 of FIG. 3, in one approach.

Continuing the example for Mary, only the video of opening gifts and the photo of Trevor and his birthday cake may be presented in a day view of Trevor's third birthday, while the blurry photo and receipt photo would be filtered out and hidden from the day view of Trevor's third birthday. This would allow Mary to more easily access desired assets from Trevor's third birthday party without needing to navigate through undesired content (like the blurry photo and receipt photo), thereby providing a better user experience because the media library application identifies the most meaningful assets (e.g., based on aesthetics, people, location, etc.) and presents those assets to the user prominently.

An example day view 300 focusses on Apr. 1, 2019, and displays eleven curated assets 308 from this day within day card 302. Day card 302 includes a timeframe reference 304 which indicates the particular day represented by day card 302 (Apr. 1, 2019) and a contextual description 306 of curated assets 308 included in day card 302 ("Anniversary"). The timeframe reference 304 may be determined based on metadata of curated assets 308 (e.g., a timestamp for creation, timestamp for last modified, timestamp for when asset is received in media library, etc.). The contextual description 306 may be created based on metadata associated with curated assets 308, information about the user of the media library (important dates, profile information describing the user, social media information, etc.), information about family members of the user, information about friends of the user, etc. This collected information may be used to determine an appropriate contextual description for assets 308. As shown, curated assets 308 relate to an anniversary for the user or another person represented in curated assets 308 in an example, but any event, holiday, trip, location, date, etc., may be considered in determining the contextual description 306.

In one approach, the contextual description 306 is automatically generated, and may be user-editable after creation to allow the user to more concisely or accurately describe curated assets 308 included in day card 302.

Some assets 308 on day card 302 are shown larger than other assets. A decision as to which assets to promote (e.g., show larger) may be based on which assets are determined to be key asset(s) for the day. A key asset may be determined, in an example, based on a curation score of the curated assets shown to the day card 302. For example, the largest asset positioned at a top of day card 302 may be a key asset for Apr. 1, 2019. The next largest asset shown at a lower left corner of day card 302 may also be a key asset having a next highest curation score. Calculation of curation scores is described in more detail later, and any method of determining a key asset may be used, alone or in conjunction with curation scores or some other known method of determining key assets.

The choice of which assets 308 to show on day card 302 and which assets to hide from the day view 300 may be based on several factors. One intent in determining how many and what sizes of assets to display to the various day cards 302 is to eliminate any white space where assets are not shown in day view 300.

In one example, an asset count reference 314 may be included on day card 302 which indicates a total number of assets that exist for Apr. 1, 2019 in the media library, e.g., 34. The location of where the asset count reference 314 is displayed is not limited to the position shown in FIG. 3, as it may be located on a left side of the day card 302, right side, center, top, bottom, etc. The asset count reference 314 may also indicate a chronological order for the asset shown within the total number of assets in an example, e.g., 10, indicating that the asset shown is the $10^{th}$ asset captured in for April 1. The asset count reference 314 as shown in day view 300 is just one example of how information may be relayed to a user, and many other possibilities are available for providing information about the assets available in the media library for each particular day. Moreover, in an approach, selection of asset count reference 314 may open an all asset view with a focus on the key asset for Apr. 1, 2019.

According to one approach, day view 300 may include multiple day cards 302 for a single day in response to multiple types of events being captured on the same day. The groupings for the assets may be based on where and when the assets were created. In one example, assets captured at a user's work location, assets captured at a user's home location, assets captured during a trip outside of a user's locale area, and assets captured for any and all other events may be displayed on separate cards 302 on the day view 300 for the same day in which they are captured.

Other event types may be added to these four types and used to group together assets captured on same days for display in the day view 300, as would be apparent to one of skill in the art upon reading the present disclosures.

To determine whether assets are created at the same event, several different criteria may be considered. One criterion for determining whether assets are created at the same event is an elapsed time between the capture of the individual media items. For example, if there is a break, pause, or time lapse of greater than a threshold amount (e.g., 1 hour, 2 hours, etc.) between the time of capture for any two assets, it is indicative of the assets being from different events. Another criterion for determining whether assets are created at the same event is whether the assets were captured using the same device or different devices. For example, two assets captured at about a same time but at different locations using different devices most likely are not of the same event, while assets captured at about the same time by the same device probably are of the same event. In another example, assets captured at about the same time at the same location by different devices probably are of the same event, but when location data is not available, the different device capturing the asset may be used as a clue of whether the assets represent the same event. Another criterion for determining whether assets are created at the same event is persons recognized in the assets. For example, if the same person or group of people appear in several assets, they are more likely to be of the same event. Yet another criterion for determining whether assets are created at the same event is a location where an asset is captured, as specified by metadata or input from the user. For example, a group of photos captured at the same location are probably of the same event.

Any of the above criteria may be used alone or in combination to provide a more accurate assessment of whether a group of assets are from the same event, even if some of the assets in the group were obtained from different devices, by different users, at different locations, across a range of different times, etc.

In an approach, each event may be limited to collecting assets from one device and for one time period. The time period may not extend past 3 AM or 4 AM in a couple of examples, to allow for the user to have at least a 3-4 hour break for sleep. A time period may begin on a new day starting at 5 AM or 6 AM, in several examples. The clock of the device which captured the asset is used to timestamp when the asset was created, with local time for where the device is located at a time of capturing the asset being used.

In one example, density-based clustering may be used for determining which assets belong to an event. Some rules may be applied to the collection of assets for a particular grouping. For example, GPS error correction may be applied to determine an accurate location for the asset, assets received from other devices may be collected in a separate group even if they are determined to be from the same event, each distinct location where assets are created may be considered a different event, continual movement of greater than a threshold velocity may signal a continued event, etc.

Ribbon element 210 may be shown in day view 300 to indicate that the current view is day view 300 by highlighting Day label 216 in an example. Ribbon element 210 may also be configured to receive user input to navigate to another view using one of the labels (e.g., Year label 212, Month label 214, All label 218). Day views include both individual day cards (e.g., day card 302) and aggregation cards (e.g., aggregation card 312).

In one example, multiple day cards may be shown in day view 300 from a first day, and then one or more day cards from another day may be shown when day view 300 has space to fit all the multiple day cards.

In another example, because day card 302 for Apr. 1, 2019 does not fill the entire GUI, other day and/or aggregation cards (as appropriate in a chronological ordering) may be displayed before and/or after day card 302. For example, aggregation card 312 is shown below (after) day card 302 which displays curated assets 310 for an aggregation of days (Apr. 2-4, 2019) that represent a trip to Napa. Aggregation cards that represent multiple days are described in more detail with reference to FIG. 4A.

Figure 4A:
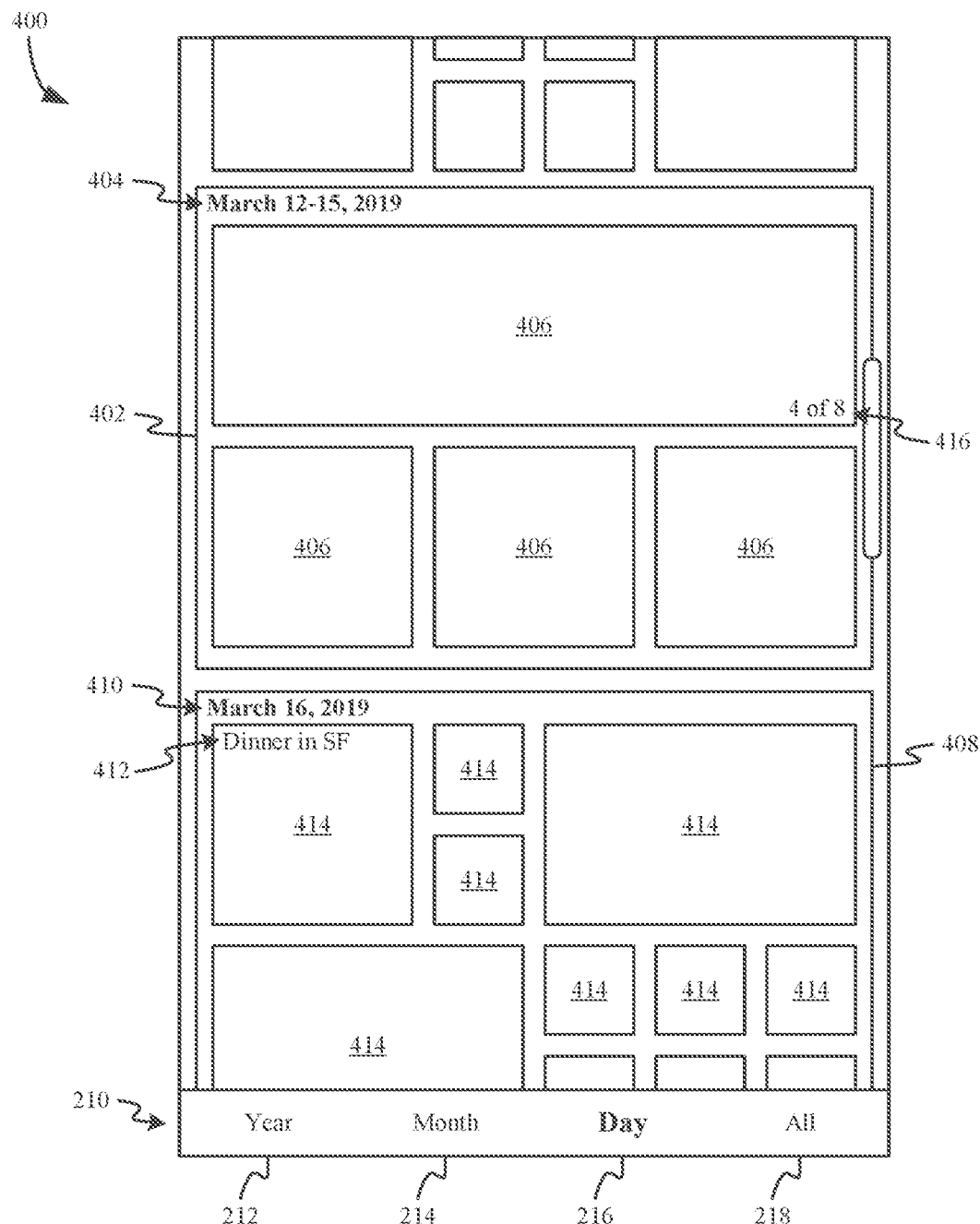
FIG. 4A shows an example day view of the media library application focusing on an aggregation card.

FIG. 4A shows an example day view 400 of the media library application focusing on an aggregation card 402. This view 400 may be used to display some or all assets associated with multiple consecutive days (Mar. 12-15, 2019 for example).

In one approach, day view 400 displays curated assets 406 on aggregation card 402 in response to a determination that there are not enough assets from any of the individual days of the aggregation period (March 12-15) to display the days on separate day cards. In other words, the media library application may determine a number of curated assets for each day, compare the number of curated assets for each day with a predetermined day card threshold (e.g., two, three, four, five curated assets, etc.), and determine whether one or more of the particular days should be represented with its own day card, or aggregated together with other adjacent days (previous day or subsequent day) to form an aggregation card to represent assets during the aggregation period.

In one example, one or more days may not have any assets associated with those days, and therefore may be included in an aggregation card with one or more other consecutive days, which may or may not include curated assets.

In an example, presence of an asset for a particular day is not sufficient to cause the asset to be presented on an individual day card, or even display the asset on an aggregation card; instead, only curated assets are included in a determination of whether to use an aggregation card or a day card to present assets in the media library in one approach.

In another approach, an aggregation card may be used to represent a trip that may span one or more days away from a user's typical locale. In this approach, each user may have a locale area assigned to the user based on historical device location information obtained from electronic devices that are used by the user, e.g., a smartphone, laptop computer, etc. By ascertaining a typical locale for a user, it can be determined when the user leaves the locale area, which generally indicates that the user has taken a trip. In several examples, the locale area for a user may include an area of between 30 square kilometers and 100 square kilometers centered at a home location of the user, such as a locale area of about 70 square kilometers.

The locale area may be expanded or contracted for a particular user based on historical location data. For example, if Sam typically stays within an area of 20 square kilometers around his home, then the locale area for Sam may be set at 20 square kilometers surrounding his home. Then, if Sam begins regularly travelling outside of this set locale area, it may be enlarged to include the regular activity.

In another example, if Susan travels to work a great distance from home, because she lives in Tracy, Calif. and works in San Francisco, Calif. about 100 kilometers away, the locale area for Susan may be set to include this distance to work (about 100 kilometers) within a radius of the locale area, such that the locale area for Susan may encompass an area of more than about 31,400 square kilometers. In other approach, two distinct locale areas may be set for Susan, one around her work location and one around her home location, with the path between the two locations being ignored for determination of a trip being taken by Susan.

In an example, a home location for a user may be determined based on historical location data for the user and the user's associated electronic devices which have location services enabled thereon. A user typical spends most nights at home, and therefore a majority of nights spent at a single location is an indication that this location is the user's home location. A location of a device may also be determined based on which cell tower is used for mobile communications at different times of the day, along with other indicia of location that may obtained by the media library application from device information.

Also, in an example, a user's work location may also be determined based on historical location data. Typically, if a user spends most weekdays at a location other than the user's home location, then this location is most likely the user's work location.

Using these techniques, or other techniques known in the art, a home location and a work location may be determined for each user, individually, for use in determining how to enrich the user experience for presentation of assets in the media library for each user.

Example day view 400 focusses on aggregation period Mar. 12-15, 2019, and displays four curated assets 406 from within this aggregation period on aggregation card 402. Aggregation card 402 may include a timeframe reference 404 which indicates the particular aggregation period represented by aggregation card 402 (Mar. 12-15, 2019). Although not shown, a contextual description of curated assets 406 may be included in aggregation card 402 in some approaches. The timeframe reference 404 may be determined based on metadata of curated assets 406 (e.g., a timestamp for creation, timestamp for last modified, timestamp for when asset is received in media library, etc.).

FIG. 10 shows an example curation process that may be used in the context of determining which assets to display to card(s) in day view 400 of FIG. 4A, in one approach.

Some assets 406 on aggregation card 402 are shown larger than other assets. A decision as to which assets to promote (show larger) may be based on which assets are determined to be key asset(s) for the aggregation of days. A key asset may be determined, in an example, based on a curation score of all assets collected for a particular day. For example, the largest asset positioned at a top of aggregation card 402 may be a key asset for time period Mar. 12-15, 2019. The other assets shown all appear with a same size, indicating that none of these assets are key assets for this time period. Calculation of curation scores is described in more detail later, and any method of determining a key asset may be used, alone or in conjunction with curation scores or some other known method of determining key assets.

The choice of which assets 406 to show on aggregation card 402 and which assets to hide from the day view 400 may be based on several factors. In one example, an asset count reference 416 may be included on aggregation card 402 which indicates a total number of assets that exist for Mar. 12-15, 2019 in the media library, e.g., 8. The asset count reference 416 may also indicate a chronological order for the asset shown within the total number of assets in an example, e.g., 4, indicating that the asset shown is the $4^{th}$ asset captured in the time period of March 12-15. In another example, the asset count reference 416 may indicate numbers for the day in which the asset shown was captured rather than overall numbers for the aggregation time period. The asset count reference 416 as shown in day view 400 is just one example of how information may be relayed to a user, and many other possibilities are available for providing information about the assets available in the media library for each particular day. Moreover, in an approach, selection of asset count reference 416 may open an all asset view with a focus on the key asset for Mar. 12-15, 2019.

According to one approach, day view 400 may include multiple day cards 408 for a single day in response to multiple types of events being captured on the same day. The groupings for the assets may be based on where and when the assets were created. In one example, assets captured at a user's work location, assets captured at a user's home location, assets captured during a trip outside of a user's locale area, and assets captured for any and all other events may be displayed on separate day cards 408 on the day view 400 for the same day in which they are captured.

Other event types may be added to these four types and used to group together assets captured on same days for display in the day view 400, as would be apparent to one of skill in the art upon reading the present disclosures.

Ribbon element 210 may be shown in day view 400 to indicate that the current view is day view 400 by highlighting Day label 216 in an example. Ribbon element 210 may also be configured to receive user input to navigate to another view using one of the labels (e.g., Year label 212, Month label 214, All label 218). Day views include both individual day cards (e.g., day card 408) and aggregation cards (e.g., aggregation card 402).

Because aggregation card 402 for aggregation period Mar. 12-15, 2019 does not fill the entire GUI, day card 408 is shown below (after) aggregation card 402 which displays curated assets 414 for an individual day (Mar. 16, 2019) that represent a dinner in San Francisco. The event is indicated by the contextual reference 412, while the date associated with day card 408 is indicated by timeframe reference 410.

Figure 4B:
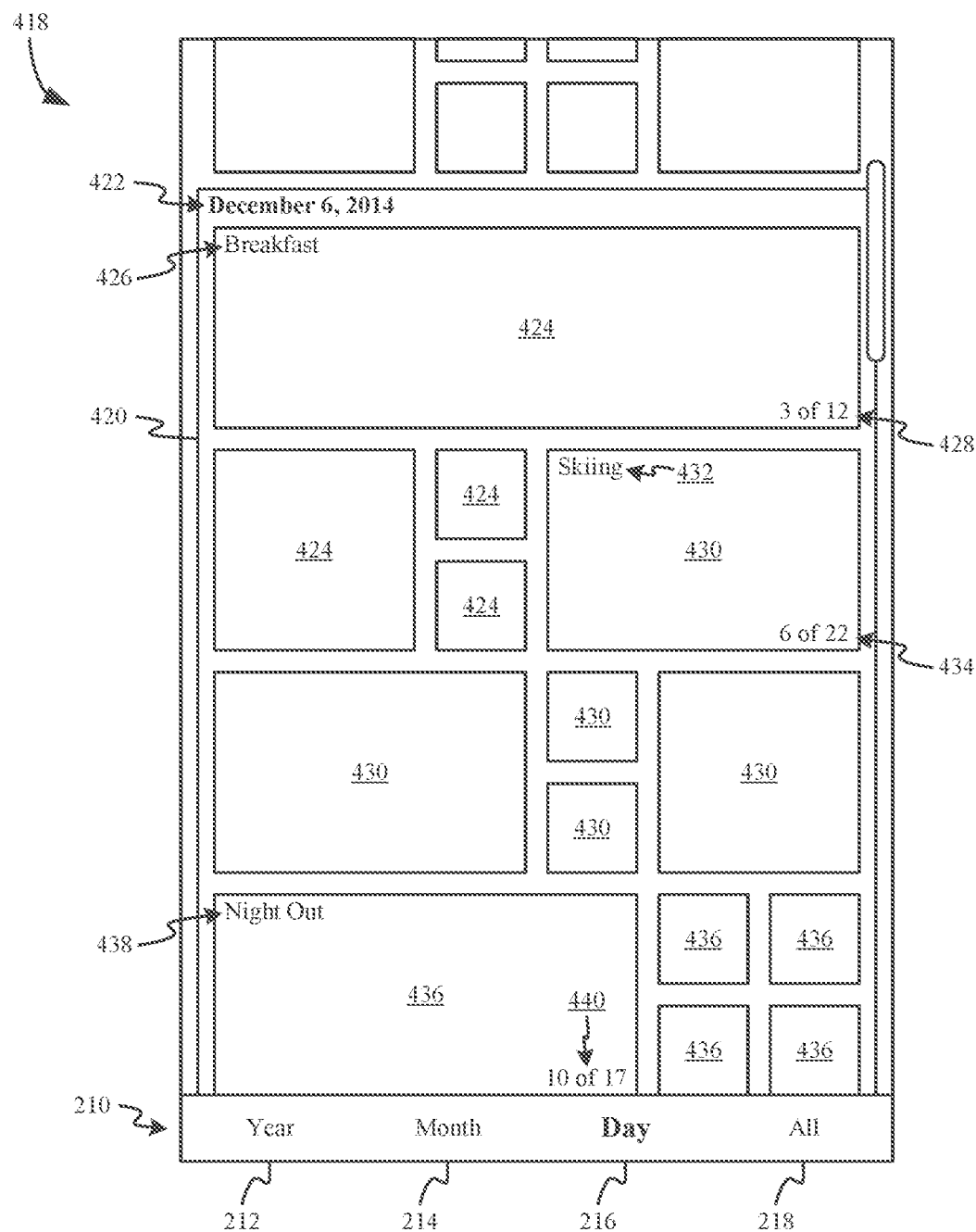
FIG. 4B shows an example day view of the media library application focusing on a single day card showing multiple events.

FIG. 4B shows an example day view 418 of the media library application focusing on a single day card 420 showing multiple events. This view 418 may be used to display some or all assets associated with the single day, regardless of a location or event in which the assets were acquired or captured (Dec. 6, 2014 for example). In an example, assume that on this day, Mary was on a ski trip where she had breakfast in the morning at a café, skied during the day, then went out to a restaurant and some cocktails in the evening. Each of these different events may be captured on different day cards or on the same day card, in several approaches.

In one approach, day view 418 displays curated assets 424 on day card 420 for Dec. 6, 2014 that are directed to "Breakfast" as indicated by contextual reference 426. Four curated assets 424 are shown for the Breakfast event, with the key asset (shown larger than the other curated assets for Breakfast) having an asset count reference 428.

In one example, the asset count reference 428 may indicate a total number of assets that exist for the Breakfast event on Dec. 6, 2014 in the media library, e.g., 12. The asset count reference 428 may also indicate a chronological order for the asset shown within the total number of assets in an example, e.g., 3, indicating that the asset shown is the $3^{rd}$ asset captured for the Breakfast event. In another example, the asset count reference 428 may indicate numbers for the day in which the asset shown was captured rather than numbers for the event. The asset count reference 428 as shown in day view 418 is just one example of how information may be relayed to a user, and many other possibilities are available for providing information about the assets available in the media library for each particular day and/or event. Moreover, in an approach, selection of asset count reference 428 may open an all asset view with a focus on the key asset for the Breakfast event on Dec. 6, 2014.

As shown in this example, day view 418 also displays curated assets 430 on day card 420 for Dec. 6, 2014 that are directed to "Skiing" as indicated by contextual reference 432. Five curated assets 430 are shown for the Skiing event, with the key asset (shown with the contextual reference 432 having an asset count reference 434.

In one example, the asset count reference 434 may indicate a total number of assets that exist for the Skiing event on Dec. 6, 2014 in the media library, e.g., 22. The asset count reference 434 may also indicate a chronological order for the asset shown within the total number of assets in an example, e.g., 6, indicating that the asset shown is the $6^{th}$ asset captured for the Skiing event. The asset count reference may display other information and function as described above, in more examples.

Also shown in this example, day view 418 displays curated assets 436 on day card 420 for Dec. 6, 2014 that are directed to "Night Out" as indicated by contextual reference 438. Five curated assets 436 are shown for the Night Out event, with the key asset (shown larger with the contextual reference 438 having an asset count reference 440.

In one example, the asset count reference 440 may indicate a total number of assets that exist for the Night Out event on Dec. 6, 2014 in the media library, e.g., 17. The asset count reference 440 may also indicate a chronological order for the asset shown within the total number of assets in an example, e.g., 10, indicating that the asset shown is the $10^{th}$ asset captured for the Night Out event. The asset count reference may display other information and function as described above, in more examples.

FIG. 10 shows an example curation process that may be used in the context of determining which assets to display to day card 420 in day view 418 of FIG. 4B, in one approach.

Some assets in each event may be displayed larger to day card 420 than other assets. A decision of which assets to promote (e.g., show larger) may be based on which assets are determined to be key asset(s) for the events of the day. A key asset may be determined, in an example, based on a curation score of all assets collected for a particular event within the day. For example, the largest asset positioned at a top of day card 420 may be a key asset for the day. Calculation of curation scores is described in more detail later, and any method of determining a key asset may be used, alone or in conjunction with curation scores or some other known method of determining key assets. Moreover, the choice of which assets 406 to show on day card 420 and which assets to hide from the day view 418 may be based on several factors as also described herein.

According to one approach, day view 418 may include multiple day cards for a single day in response to multiple types of events being captured on the same day. In another approach, as shown in FIG. 4B, one day card 420 may show multiple events. The groupings for the assets may be based on where and when the assets were created. In one example, assets captured at a user's work location, assets captured at a user's home location, assets captured during a trip outside of a user's locale area, and assets captured for any and all other events may be displayed on separate day cards on the day view 420 for the same day in which they are captured.

Other event types may be added to these four types and used to group together assets captured on same days for display in the day view 420, as would be apparent to one of skill in the art upon reading the present disclosures.

Ribbon element 210 may be shown in day view 418 to indicate that the current view is day view 418 by highlighting Day label 216 in an example. Ribbon element 210 may also be configured to receive user input to navigate to another view using one of the labels (e.g., Year label 212, Month label 214, All label 218). Day views include both individual day cards (e.g., day card 420) and aggregation cards.

Figure 5:
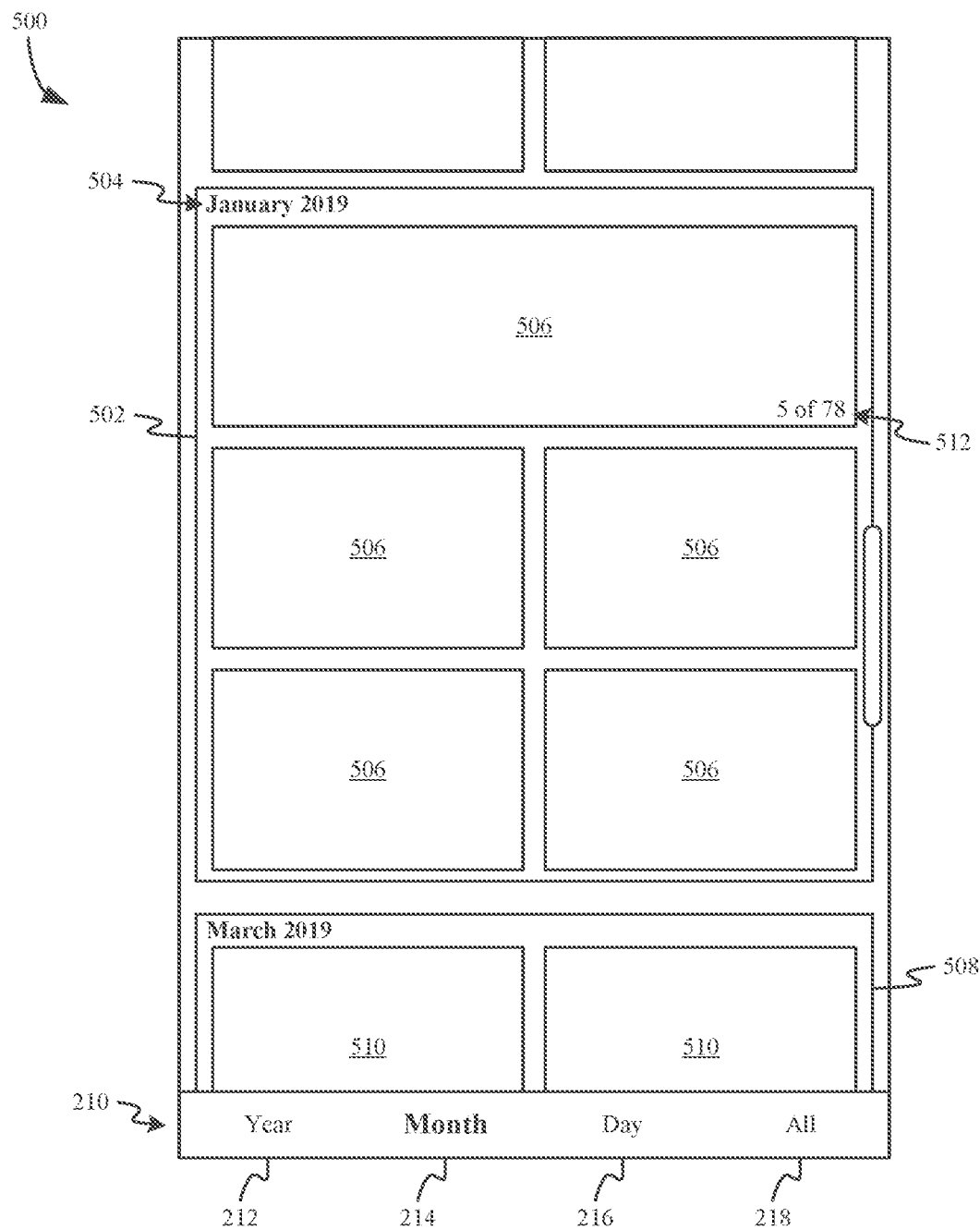
FIG. 5 shows an example month view for the media library application focusing on a month card.

FIG. 5 shows an example month view 500 for the media library application focusing on a month card 502. This view 500 may be used to display key assets 506 associated with a particular month (January 2019 for example). Key assets 506 are assets from the media library associated with the particular month card 502 that are determined to be the best assets to represent the month (e.g., most likely to be important, desirable, memorable, aesthetically pleasing, etc.).

Key assets may be selected from curated assets based on curation scores of the various curated assets. A curated asset which attains a highest curation score for a particular week in a month may be selected as the key asset to represent that week, in one approach.

In another approach, a threshold curation score may be determined, and this threshold curation score may be compared to curation scores calculated for curated assets for the month. The threshold curation score may be dynamically determined to only select a certain percentage of assets to be key assets (e.g., a top 10%, 5%, 2%, 1%, 0.5%, etc.). All curated assets that have a curation score greater than or equal to the threshold curation score may be considered a key asset for the month in this approach.

In an example, determining which key assets to display for a month may include randomly selecting up to five key assets from amongst all key assets for a particular month and displaying these selected key assets on month card 502. Each time month card 502 is navigated to by a user, another set of key assets may be randomly selected and displayed. In this way, the month card 502 may dynamically change each time it is navigated to, but still displays only key assets for the month represented which are most likely to be the best assets taken from the month.

A curation score for a particular curated asset may be determined based on one or more factors. Example factors used to determine a curation score include, but are not limited to, a global aesthetic, a number of shares for the particular asset, a number of views for the particular asset, a number of persons identified in the particular asset, a size of a grouping of assets that includes the particular asset, an imputed meaning for the particular asset, etc. An example process for determining key assets is described in more detail in FIG. 11.

Referring again to FIG. 5, in one approach, month view 500 displays up to five key assets 506 on month card 502 in response to a determination that a key asset is present for each calendar week of the particular month (e.g., January 2019). Although a month is limited to 31 days (i.e., 4 weeks+3 days), sometimes a month may be spread across five calendar weeks. Therefore, a month card 502 may be represented by up to five key assets 506 in an approach.

For example, January 2019 starts on a Tuesday and ends on a Thursday; therefore, calendar weeks of January 2019 may be: 1) Tuesday January 1-Saturday January 5, 2) Sunday January 6-Saturday January 12, 3) Sunday January 13-Saturday January 19, 4) Sunday January 20-Saturday January 26, and 5) Sunday January 27-Thursday January 31. Of course, calendar weeks may begin on any day of the week (Saturday, Sunday, Monday, etc.) but are limited to including seven days, unless they are the first or last calendar week, where they may include less than seven days.

In one example, one or more calendar weeks of a month may not have any key assets associated with those weeks, and therefore may not have a key asset shown on month card 502. In an example, a month which includes no key assets may not have a month card shown in month view 500, as shown by the absence of a month card for February 2019 between month card 502 for January 2019 and month card 508 for March 2019 that shows key assets 510 for March 2019. In another example, each month may be represented by at least a timeframe reference 504, even if no key assets are displayed on a month card.

Moreover, because month card 502 for January 2019 does not fill the entire GUI, month view 500 also displays month card 508 below (after) month card 502. The portion of month card 508 that is visible displays key assets 510 for the next month having key assets to display, e.g., March 2019.

In some approaches, one or more of the key assets 506 on month card 502 may include a contextual description (not shown). An optional contextual description may be displayed at all times, or only when a user is interacting with, has selected, or otherwise focusses on a particular key asset of month card 502, in various examples. Any type of user input may be used to determine interest in a particular key asset, such as hovering over the key asset with a mouse cursor, finger hovering over the key asset using a touchscreen, touch and hold input, etc.

The choice of which key assets 506 to show on month card 502 and which assets to hide from the month view 500 may be based on several factors. In one example, an asset count reference 512 may be included on month card 502 which indicates a total number of assets that exist for January 2019 in the media library, e.g., 78. The asset count reference 512 may also indicate a chronological order for the shown asset within the total number of assets in an example, e.g., 5, indicating that the asset shown is the $5^{th}$ asset captured in January. In another example, the asset count reference 512 may indicate numbers for a single day of January in which the asset shown was captured rather than overall month numbers. The asset count reference 512 as shown in month view 500 is just one example of how information may be relayed to a user, and many other possibilities are available for providing information about the assets available in the media library for each particular month. Moreover, in an approach, selection of asset count reference 512 may open a day view with a focus on the key asset for January 2019.

Ribbon element 210 may be shown in month view 500 to indicate that the current view is month view 500 by highlighting Month label 214 in an example. Ribbon element 210 may also be configured to receive user input to navigate to another view using one of the labels (e.g., Year label 212, Day label 216, All label 218). Day views may include both individual day cards and aggregation cards when appropriate.

Figure 6A:
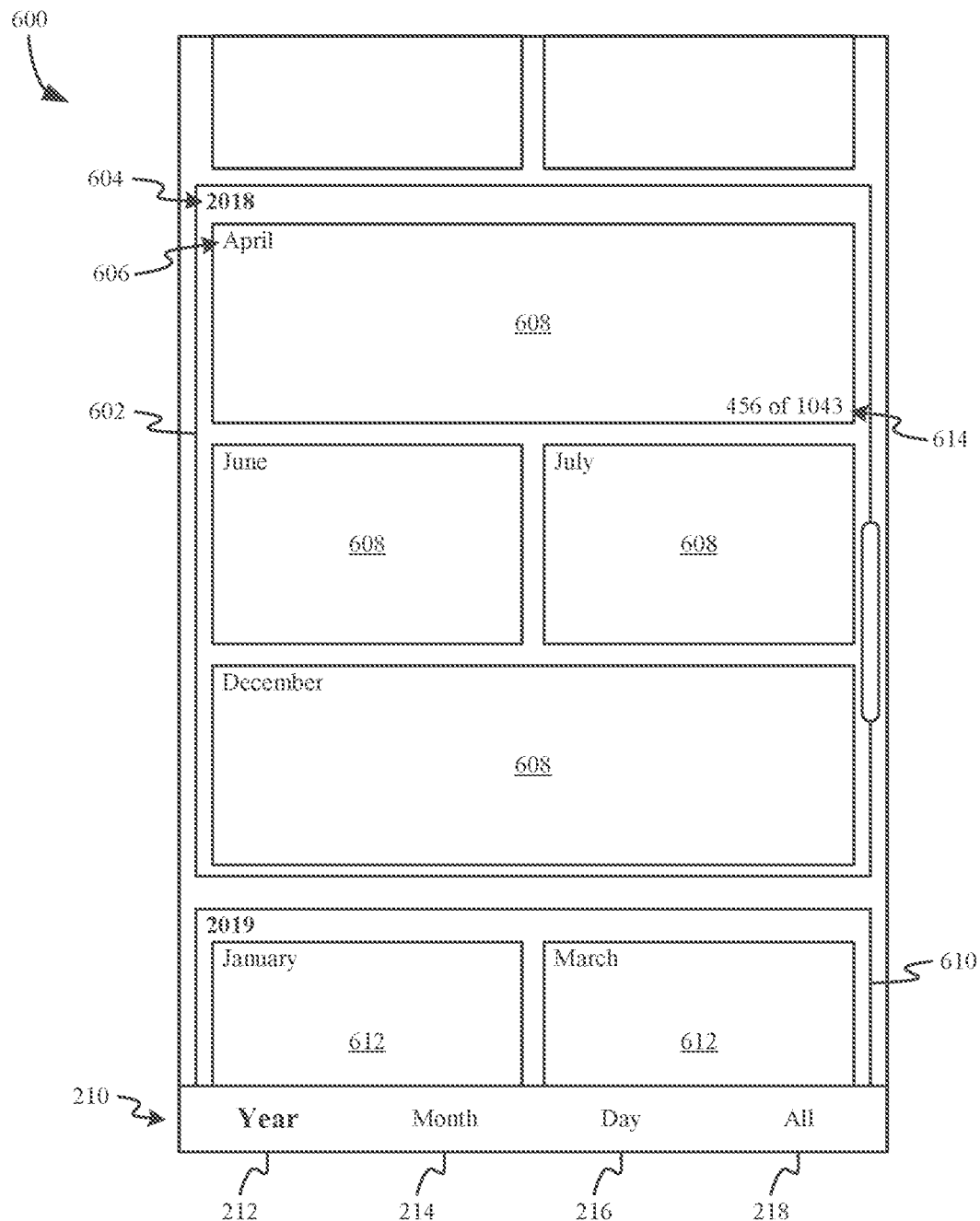
FIG. 6A shows an example year view for the media library application focusing on a year card.

FIG. 6A shows an example year view 600 for the media library application focusing on a year card 602. This view 600 may be used to display one or more key assets 608 associated with the particular year (e.g., 2018). In one approach, one or more particular months (e.g., April, June, July, December) of a particular year (2018 for example) may have key assets 608 displayed for year card 602.

Year card 602 may include a timeframe reference 604 (indicating the year as "2018") and/or one or more contextual descriptions 606. In this example, each contextual description 606 may indicate a month from which a key asset 608 is derived. In other examples, contextual descriptions 606 may include a description of an event or activity of the corresponding key asset 608.

An optional contextual description may be displayed at all times, or only when a user is interacting with, has selected, or otherwise focusses on a particular key asset of year card 602, in various examples. Any type of user input may be used to determine interest in a particular key asset, such as hovering over the key asset with a mouse cursor, finger hovering over the key asset using a touchscreen, touch and hold input, etc.

The choice of which key assets 608 to show on year card 602 and which assets to hide from the year view 600 may be based on several factors. In one example, an asset count reference 614 may be included on year card 602 which indicates a total number of assets that exist for 2018 in the media library, e.g., 1043. The asset count reference 614 may also indicate a chronological order for the shown asset within the total number of assets in an example, e.g., 456, indicating that the asset shown is the $456^{th}$ asset captured in the year 2018. In another example, the asset count reference 614 may indicate numbers for the month of April rather than overall year numbers. The asset count reference 614 as shown in year view 600 is just one example of how information may be relayed to a user, and many other possibilities are available for providing information about the assets available in the media library for each particular year and month. Moreover, in an approach, selection of asset count reference 614 may open a day view or a month view with a focus on the key asset for January 2019.

Ribbon element 210 may be shown in year view 600 to indicate that the current view is year view 600 by highlighting Year label 212 in an example. Ribbon element 210 may also be configured to receive user input to navigate to another view using one of the labels (e.g., Month label 214, Day label 216, All label 218). Day views may include both individual day cards and aggregation cards when appropriate.

In an example, key asset(s) 608 displayed for year card 602 may be selected from key assets of months for year 2018. Because key assets 608 shown for year card 602 are selected from key assets for months in the particular year represented by year card 602 (e.g., 2018), and not all months may have key assets, as discussed previously, not every month in year 2018 may be shown on year card 602 in this example.

In an example, one key asset for each month in 2018 (the year represented for year card 602) that has a key asset may be displayed, in an approach, with each key asset 608 shown being determined to be the best asset to represent the corresponding month (e.g., most likely to be important, desirable, memorable, aesthetically pleasing, etc.).

In one approach, a curation score that is used to determine key asset may be based on significant event(s) within a respective month that would be important to the user. For example, if January is the birth month for Mary's son Trevor, then one or more key assets shown on a month card for January may be of Trevor's birthday in a previous year, or possibly images of Trevor in general to reflect that January is his birth month. When multiple important people (family, friends, etc.) have birthdays in the same month, group shots of the people who share the birthday month may be selected preferentially as a key asset. Of course, other memorable, nostalgic, and important events may be reflected in key assets as would be understood by one of skill reading the present descriptions.

The single key asset 608 for each month may be selected from key assets of the particular month based on curation scores of the various key assets. A key asset which attains a highest curation score for a particular month may be selected as the key asset 608 to represent that month, in one approach.

In another approach, a threshold curation score may be determined, and this threshold curation score may be compared to curation scores calculated for key assets for each month in the year. The threshold curation score may be dynamically determined to only select a certain percentage of assets to be key assets (e.g., a top 10%, 6%, 2%, 1%, 0.6%, etc.). All curated assets that have a curation score greater than or equal to the threshold curation score may be considered a key asset for the month in this approach.

In an example, determining which key assets 608 to display for a particular month may include randomly selecting one or more key assets from amongst all key assets for a particular month and displaying these selected key assets for the particular month on year card 602. Each time year card 602 is navigated to by a user, another one or more key assets may be randomly selected and displayed in each of the month(s) displayed to year card 602. In this way, year card 602 may dynamically change each time it is navigated to, but still displays only key assets for months represented in the year which are most likely to be the best assets taken from the various months.

In another approach, only a single key asset may be displayed on year card 602. The key asset 608 chosen to represent year card 602 may be selected to be a key asset from the particular year (e.g., 2018) that has a timestamp most similar to a current date. For example, if today's date is Apr. 30, 2019, then the key asset 608 used to represent year card 602 for 2018 may be a key asset for the month of April 2018 preferentially, or the month of May 2018 if a key asset for April 2018 does not exist. Should no key asset exist for May 2018, then a key asset from another month in 2018 may be selected based on a proximity of a timestamp for the key asset and the current date, in one example.

A curation score for a particular curated asset may be determined based on one or more factors. Example factors used to determine a curation score include, but are not limited to, a global aesthetic, a number of shares for the particular asset, a number of views for the particular asset, a number of persons identified in the particular asset, a size of a grouping of assets that includes the particular asset, an imputed meaning for the particular asset, etc. An example process for determining key assets is described in more detail in FIG. 11.

Referring again to FIG. 6A, because year card 602 for 2018 does not fill the entire GUI, the year view 600 also displays year card 610 below (after) year card 602. The portion of year card 610 that is visible displays key assets 612 for the next year, 2019.

For Mary in the previous example, she may be able to see her favorite photo of Trevor and his birthday cake from his third birthday party in 2013 represented on a year card for 2013 whenever the current date is close to Trevor's birthday. The promotion of Trevor's birthday photo may be due to that photo receiving a high curation score based on the number of times that Mary has viewed the photo, a number of times she shared the photo, knowledge that the photo is of a birthday (imputed meaning of the photo), etc. Moreover, because that photo would qualify as a key asset, it may also be featured prominently on a month card for Trevor's birthday month in 2013 in one approach.

Figure 6B:
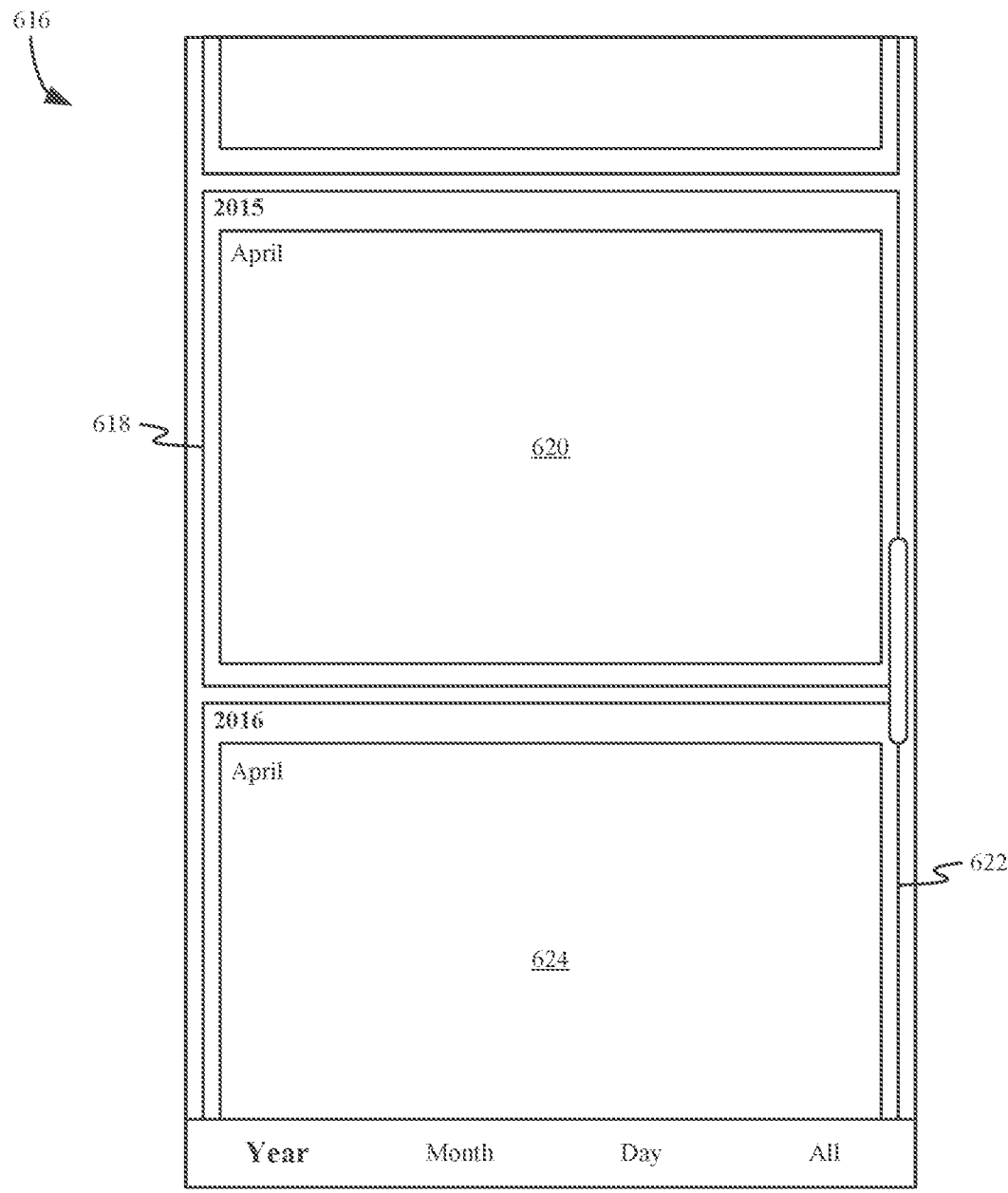
FIG. 6B shows another example year view for the media library application.

FIG. 6B shows another example year view 616 for the media library application. In year view 616, each year is represented by a single year card with a single key asset prominently displayed to the year card. For example, year card 618 for 2015 displays a key asset 620 for April of that year, 2015, while year card 622 for 2016 displays a key asset 624 for April of that year, 2016. In this example, the key assets 620, 624 are both selected from the month of April in response to a present date being in April, so that each year card 618, 622 show key assets from similar time frames in past years 2015, 2016.

In another approach, even when year view 616 displays a single asset for each year, the assets selected to be displayed may be from different time periods within the respective years.

Transitions

Figure 7:
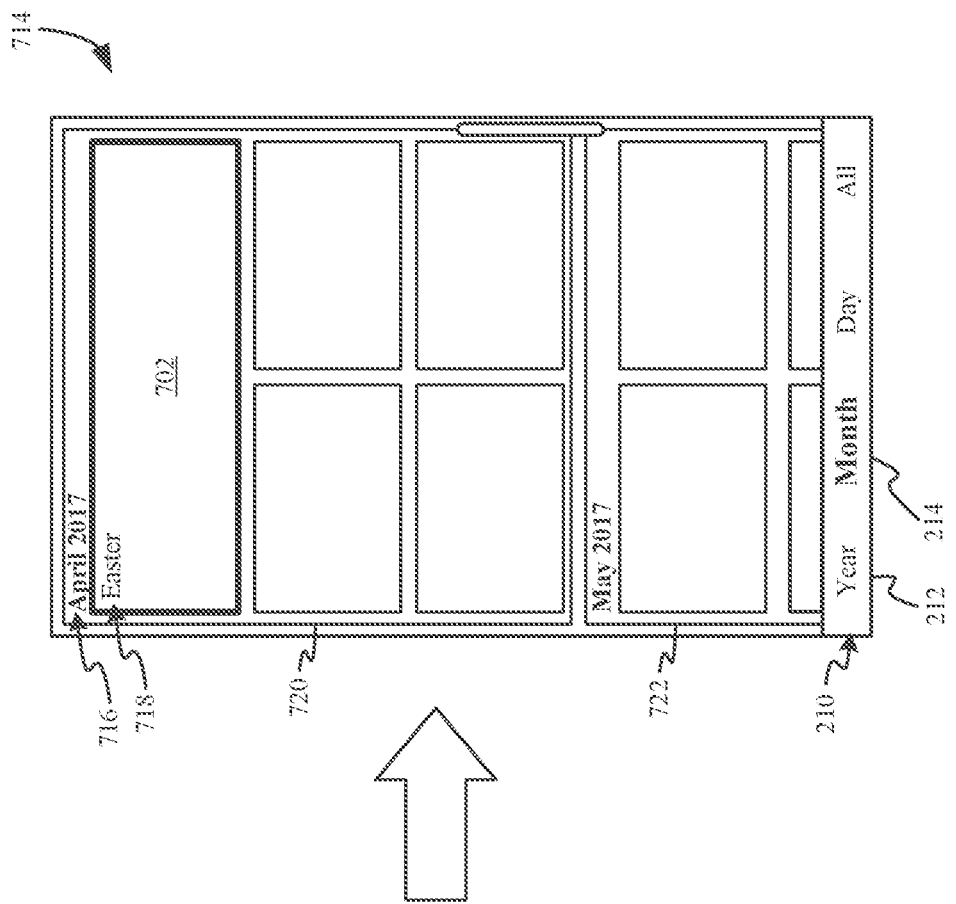
FIG. 7 shows an example transition from a year view to a month view.
Figure 7:
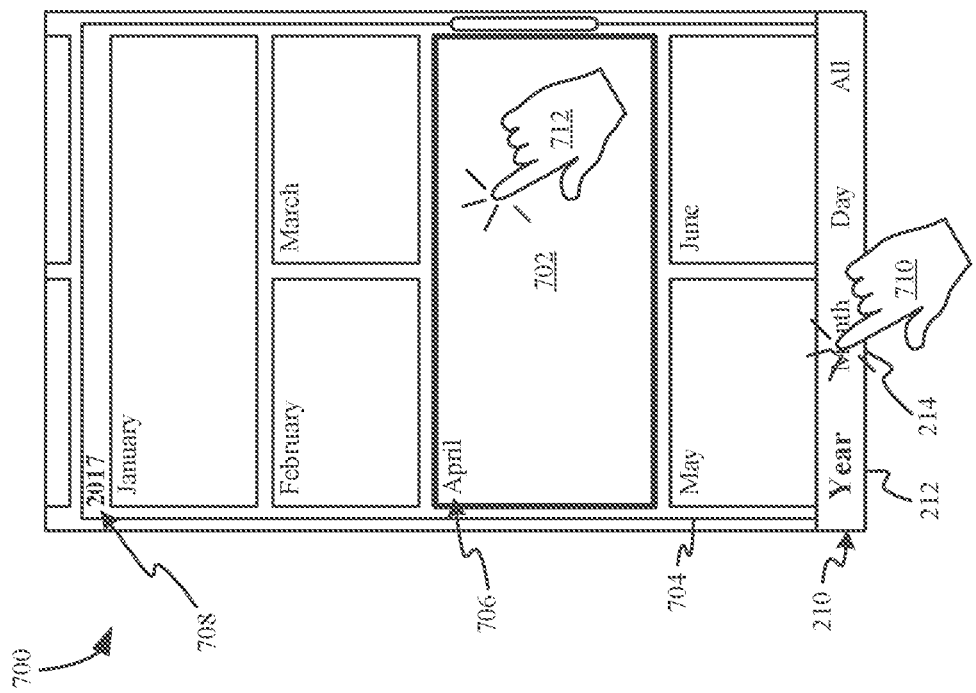

FIG. 7 shows an example transition from a year view 700 to a month view 714. In this example, year view 700 displays year card 704 for 2017 and indicates that a current view is a year view by highlighting Year label 212 on ribbon element 210. Key assets from select months are represented on year card 704. In addition, a timeframe reference 708 is included for year card 704 that indicates the card is for the year "2017." Each of the key assets for the various months are indicated with contextual descriptions 706 indicating which month the key asset represents.

Moreover, as shown in year view 700, key asset 702 is the focus of the view, as indicated by the bold frame surrounding the asset. Any other way of indicating the focus of the view 700, including not visually indicating a focus at all, may be used as would be understood by one of skill in the art. Key asset 702 may be selected as the focus in response to user input 712 selecting key asset 702, or some other way of determining a focus of a current view, such as determining that an asset located near a center of a current view is the focus, in one approach. Any other way of determining a focus of a current view may be used in more approaches, as would be understood by one of skill in the art.

In one approach, a user may select Month label 214 from ribbon element 210 with user input 710. Any type of user input 710 may be used to select Month label 214, such as a mouse hover, mouse click, touch input on a touchscreen display, stylus input on a tablet, remote control, trackpad input on a laptop computer, etc. In response to user input selecting Month label 214, the GUI may transition to month view 714 that maintains focus on key asset 702.

In another approach, a user may select a key asset 702 from year card 704 with a user input 712. Any type of user input 712 may be used to select key asset 702, such as a mouse hover, mouse click, touch input on a touchscreen display, stylus input on a tablet, remote control, trackpad input on a laptop computer, etc. In response to user input selecting key asset 702, the GUI may transition to month view 714 that maintains a focus on key asset 702.

By maintaining focus on a particular asset, what is meant, in an example, is that after transitioning to a new view, the particular asset is prominently featured in the new view (e.g., the largest asset displayed, presented with a bold or highlighted frame, pre-selected when the view is loaded, etc.). In another example, the particular asset is displayed to the new view, but not necessarily prominently featured.

As shown in month view 714, in one example, month card 720 for April 2017 is shown, with the current view being indicated as a month view by highlighting Month label 214 on ribbon element 210. Select key assets are represented on month card 720, included key asset 702, which was the focus of year view 700. In addition, a timeframe reference 716 is included for month card 720 that indicates the card is for the month "April 2017." Also, a contextual description 718 is included for month card 720 that indicates the key asset 702 relates to "Easter." Month view 714 also displays a portion of the next month card 722 for May 2017.

This transition from year view 700 to month view 714 that maintains focus on key asset 702 provides a convenient way for a user to drill down through levels of the media library to arrive at photos, videos, and other assets from a specific period of time related to a key asset 702 prominently displayed at higher levels (e.g., year view 700). In this way, a user may access additional assets related to key asset 702 and/or other assets obtained at a time frame similar to key asset 702 based on interaction with higher levels of the media library that display key asset 702.

Figure 8:
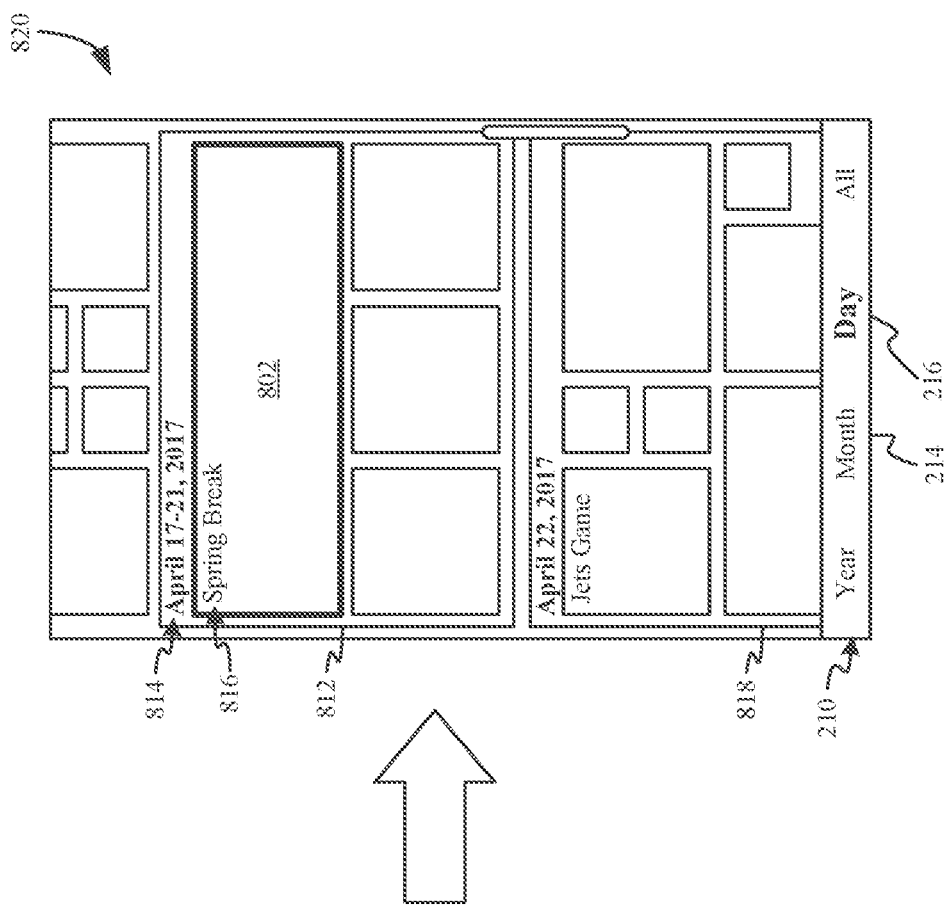
FIG. 8 shows an example transition from a month view to a day view.
Figure 8:
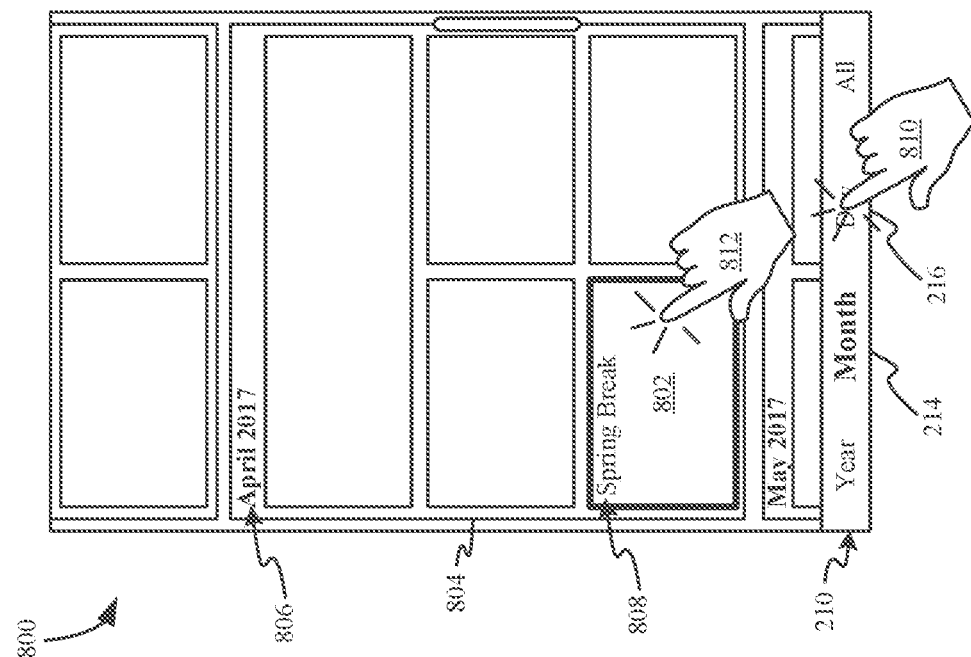

FIG. 8 shows an example transition from a month view 800 to a day view 820. In this example, month view 800 displays month card 804 for 2017 and indicates that a current view is a month view by highlighting Month label 214 on ribbon element 210. Key assets from April 2017 are represented on month card 804. In addition, a timeframe reference 806 is included for month card 804 that indicates the card is for the month "April 2017." One of the key assets 802 for April 2017 is indicated with a contextual description 808 indicating that the key asset 802 is related to "Spring Break."

Moreover, as shown in month view 800, key asset 802 is the focus of the view, as indicated by the bold frame surrounding the asset. Key asset 802 may be selected as the focus in response to user input 812 selecting key asset 802, or some other way of determining a focus of a current view, such as determining that an asset located near a center of a current view is the focus, in one approach. Any other way of determining a focus of a current view may be used in more approaches, as would be understood by one of skill in the art.

In one approach, a user may select Day label 216 from ribbon element 210 with user input 810. Any type of user input 810 may be used to select Day label 216, such as a mouse hover, mouse click, touch input on a touchscreen display, stylus input on a tablet, remote control, trackpad input on a laptop computer, etc. In response to user input selecting Day label 216, the GUI may transition to day view 820 that maintains focus on key asset 802.

In another approach, a user may select key asset 802 from month card 804 with a user input 812. Any type of user input 812 may be used to select key asset 802, such as a mouse hover, mouse click, touch input on a touchscreen display, stylus input on a tablet, remote control, trackpad input on a laptop computer, etc. In response to user input selecting key asset 802, the GUI may transition to day view 820 that maintains a focus on key asset 802.

As shown in day view 820, in one example, aggregation card 812 for Apr. 17-21, 2017 is shown, with the current view being indicated as a day view by highlighting Day label 216 on ribbon element 210. This aggregation card shows a trip that spanned several consecutive days, in this particular case it was Spring Break in 2017. Select key assets are represented on aggregation card 812, including key asset 802, which was the focus of month view 800. In addition, a timeframe reference 814 is included for aggregation card 812 that indicates the card is for multiple consecutive days of "Apr. 17-21, 2017." Also, a contextual description 816 is included for aggregation card 812 that indicates the key asset 802 and/or aggregation card 812 relate to "Spring Break." Day view 820 also displays a portion of the next day card 818 for Apr. 22, 2017. In day card 818, one of the key assets is indicated as being related to a "Jets Game" which may have taken place on Apr. 22, 2017.

This transition from month view 800 to day view 820 that maintains focus on key asset 802 provides a convenient way for a user to drill down through levels of the media library to arrive at photos, videos, and other assets from a specific period of time related to a key asset 802 prominently displayed at higher levels (e.g., month view 800). In this way, a user may access additional assets related to key asset 802 and/or other assets obtained at a time frame similar to key asset 802 based on interaction with higher levels of the media library that display key asset 802.

Figure 9:
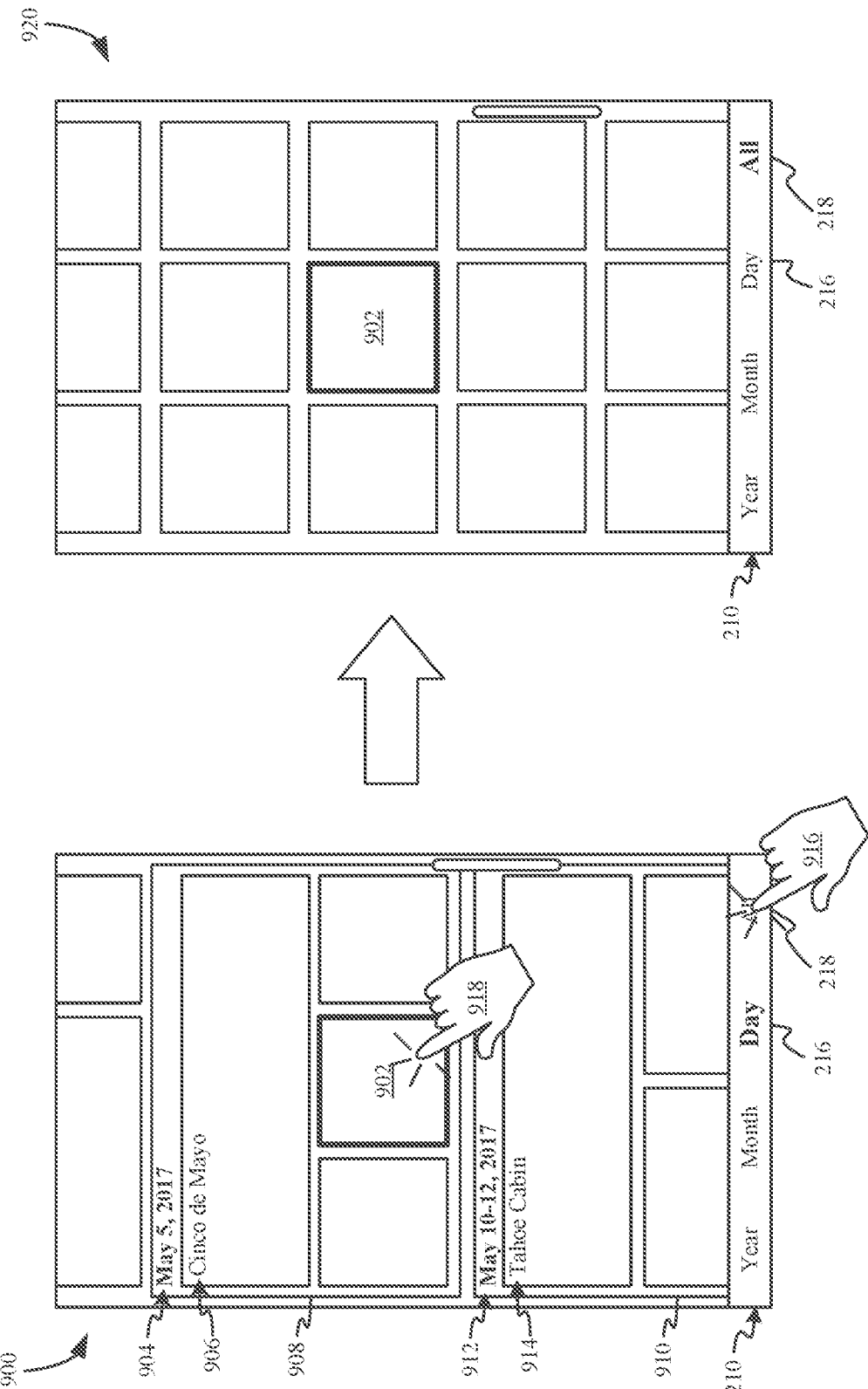
FIG. 9 shows an example transition from a day view to an all assets view.

FIG. 9 shows an example transition from a day view 900 to an all assets view 920. In this example, day view 900 displays day card 908 for May 5, 2017 and indicates that a current view is a day view by highlighting Day label 216 on ribbon element 210. Curated assets from May 5 are represented on the day card 908. In addition, a timeframe reference 904 is included for day card 908 that indicates the card is for "May 5, 2017." A largest curated asset for this day is indicated with a contextual description 906 indicating that the curated assets are related to "Cinco de Mayo."

Day view 900 also displays an aggregation card 910 following day card 900, with a timeframe reference 912 indicating the aggregation period is "May 10-12, 2017" and a contextual description 914 indicates this time frame related to "Tahoe Cabin," most likely a trip to Lake Tahoe, Calif. where the user stayed at a cabin by the lake.

Moreover, as shown in day view 900, curated asset 902 is the focus of the view, as indicated by the bold frame surrounding the asset. Curated asset 902 may be selected as the focus in response to user input 918 selecting curated asset 902, or some other way of determining a focus of a current view, such as determining that an asset located near a center of a current view is the focus, in one approach. Any other way of determining a focus of a current view may be used in more approaches, as would be understood by one of skill in the art.

In one approach, a user may select All label 218 from ribbon element 210 with user input 916. Any type of user input 916 may be used to select All label 218, such as a mouse hover, mouse click, touch input on a touchscreen display, stylus input on a tablet, remote control, trackpad input on a laptop computer, etc. In response to user input selecting All label 218, the GUI may transition to all assets view 920 that maintains focus on curated asset 902.

In another approach, a user may select curated asset 902 from day card 908 with user input 918. Any type of user input 918 may be used to select curated asset 902, such as a mouse hover, mouse click, touch input on a touchscreen display, stylus input on a tablet, remote control, trackpad input on a laptop computer, etc. In response to user input selecting curated asset 902, the GUI may transition to all assets view 920 that maintains a focus on curated asset 902.

By maintaining focus on a particular asset, all assets view 920 is scrolled to a location showing the particular asset after the transition to the new view. As shown in all assets view 920, in one example, curated asset 902 is shown in a center of the display, and ribbon element 210 shows that the current view is all assets view 920 by highlighting All label 218 and no longer highlighting Day label 216.

All assets view 920 displays every asset of the media library in chronological order, including assets that were filtered out of higher level views (e.g., day views, month views, year views) due to such assets including undesirable content, such as being blurry or out of focus, being directed to a utility purpose (photos of receipts, data and information, whiteboards, drawings and sketches, shopping lists, reminder lists, screenshots, etc.), being substantially duplicative of other curated assets promoted to the higher level views, etc.

This transition from day view 900 to all assets view 920 that maintains focus on curated asset 902 provides a convenient way for a user to drill down through levels of the media library to arrive at photos, videos, and other assets from a specific period of time related to a key asset 902 prominently displayed at higher levels (e.g., day view 900). In this way, a user may access additional assets related to key asset 902 and/or other assets obtained at a time frame similar to key asset 902 based on interaction with higher levels of the media library that display key asset 902, particularly if such assets are only displayed in all assets view 920 due to content included therein. However, a user does not need to scroll through junk images and videos, blurry images or videos, utility pictures or videos, and/or duplicated images or videos at higher levels of the media library because such assets are only displayed in all assets view 920 in an approach.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

FIG. 10 is a flow diagram of an example process 1000 for curating assets of a media library. Assets of a media library may be curated using method 1000 for any of the example views described in FIGS. 2-6B.

Referring again to FIG. 10, in operation 1002, substantially duplicate assets (e.g., images which are substantially similar to other images, videos which are substantially similar to other videos) are identified in a media library. Any method of determining a similar or duplicative image or video may be used, such as filename and size comparison, a pixel-by-pixel analysis, performing a hash of file contents for two different files and comparing the hash outcomes, etc.

By substantially similar, what is meant is that a primary focus and intent of the asset is the same for each of the similar assets, even though subtle differences may exist in the actual images or videos. For example, a sunset that is captured using burst mode may have three or more images of the same sunset captured in a very short period of time. In the curated assets, it is desirable to only include one of those sunset images, and particularly desirable to include the best of those sunset images.

In one approach, which is the best asset from a series of substantially similar assets may be determined based on a number of factors. The factors for this determination may include an aesthetic score (as described later), a number of times the asset has been shared by the user, and a number of times the user has viewed the asset. Other relevant factors may be used in place of or in conjunction with any of these identified factors, in other examples.

As a result of operation 1002, duplicative assets may be filtered out from the other assets in the media library.

In operation 1004, assets of poor quality are identified in the media library. Poor quality may indicate any of a number of characteristics for individual assets, such as assets that appear blurry, washed out or overexposed, too dark or underexposed, etc. In addition, assets that appear to be accidently captured, such as a photo in a user's pocket, may also be identified.

After identifying all of the assets exhibiting poor quality, as a result of operation 1004, these poor quality assets may be filtered out from the other assets in the media library.

In operation 1006, assets being directed to a utility purpose are identified in the media library. A utility purpose indicates that the asset was obtained to serve a certain non-aesthetic purpose, as would be understood by one of skill in the art. Some examples of assets directed to a utility purpose include, but are not limited to, photo of a receipt, photo of a whiteboard showing notes from a meeting, instructional video of a technique for performing a certain activity (like sharpening a knife, decorating a cake, etc.), photo of documents or papers, photo of drawings or sketches, photo of a shopping list, photo of a reminder, a screenshot, etc.

After identifying all of the utility assets, as a result of operation 1006, these utility assets may be filtered out from the other assets in the media library.

After operations 1002, 1004, and 1006, the remaining assets of the media library which have not been filtered out may be referred to as first curated assets. The operations 1002, 1004, and 1006 may be performed in any order in method 1000, and one or more of operations 1002, 1004, and 1006 may be omitted in certain approaches.

Figure 11:
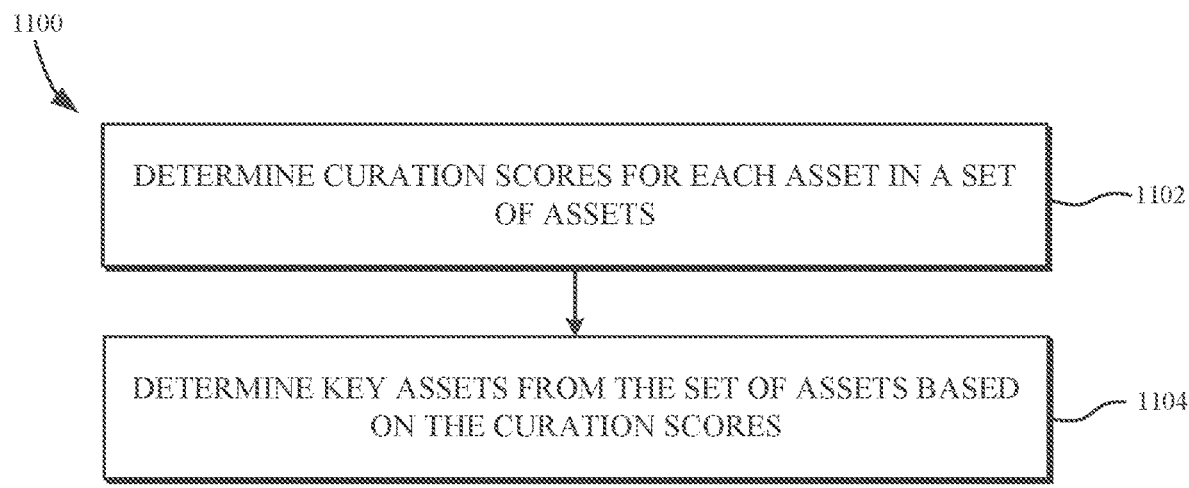
FIG. 11 is a flow diagram of an example process for determining key assets of a media library.

FIG. 11 is a flow diagram of an example process 1100 for determining key assets of a media library. Key assets of the media library may be determined using method 1100 from amongst curated assets determined using method 1000 for any of the example views described in FIGS. 2-6B.

Referring again to FIG. 11, in operation 1102, a curation score for each asset in a set of assets (the set of assets may include all first curated assets of a media library in one approach) is determined.

The curation score may be determined based on one or more factors. Example factors may include, but are not limited to, a global aesthetic, an aesthetic score for the particular asset, a number of shares for the particular asset, a number of views for the particular asset, a number of persons identified in the particular asset, a size of a grouping of assets that includes the particular asset, an imputed meaning for the particular asset, etc.

A global aesthetic describes a highest aesthetic score possible using an algorithm or set of algorithms, and represents an optimally-aesthetically pleasing image or series of images (in the case of a video) as determined by experts in the field. The global aesthetic score may be compared to individual aesthetic scores calculated for individual assets to determine how far from the global standard the particular assets rate. To accomplish this comparison, an aesthetic score is calculated for each of the assets individually using the same algorithm or set of algorithms used to calculate the global aesthetic. Then, a determination is made as to a difference between the global aesthetic and the individual aesthetic for each asset.

In one approach, only assets which achieve an aesthetic score meeting a certain threshold may be considered for further processing, while unaesthetically pleasing assets may be dropped from consideration. In a different approach, the individual aesthetic score may be used in a weighted overall analysis of the particular asset.

The weighted overall analysis may assign a certain weight to several different factors, then weight-average the factors together to achieve a weighted curation score for the particular asset. Any way of determining specific weights for the various factors may be used, as would be known to one of skill in the art.

In an example, a photo which has been shared by a user to many other people over the past two weeks may indicate that the user really likes the photo and would like to see it more often. Therefore, a weighted overall analysis for a particular asset may consider how many times the particular asset has been shared by the user. This determination may further be limited to a certain recent timeframe to remove the influence of past proclivities of the user which may not reflect current inclinations.

In another example, a photo which has been viewed by a user repeatedly over the past two weeks may indicate that the user really likes the photo and would like to see it more often. Therefore, a weighted overall analysis for a particular asset may consider how many times the particular asset has been viewed by the user. This determination may further be limited to a certain recent timeframe to remove the influence of past proclivities of the user which may not reflect current inclinations.

In another example, a photo with many family members shown may be more favorable to a user than a photo which does not include any faces or a photo with only one friend. Therefore, a weighted overall analysis for a particular asset may consider how many persons can be identified in the particular asset (e.g., how many faces are recognized by facial recognition software, and possibly a relationship of these persons to the user).

In another example, a user may take many photos at a concert or on a trip because the user wants to capture and remember this time. All of these photos may be grouped together based on them being from the same event (the concert) or from the same trip. Therefore, a weighted overall analysis for a particular asset may consider a size of a grouping of assets that includes the particular asset.

In another example, special occasions and events typically mean more to a user than random photos not attached to a special event or time in a user's life. Therefore, a weighted overall analysis for a particular asset may consider an imputed meaning for the particular asset. Metadata, tie of creation, persons shown in the asset, and any other relevant characteristics of the assets may be used to determine the meaning of the particular asset. Some example meanings include, but are not limited to, birthdays, weddings, anniversaries, birth of children, graduations, trips, religious events, etc.

In operation 1104, key assets from the set of assets are determined based on the curation scores of the set of assets.

In one approach, any asset which achieves a weighted average across all factors (e.g., a curation score) that meets a certain threshold may be considered a second curated asset or key asset, while assets which do not meet the weighted average threshold are not key assets and remain just first curated assets.

In another example, a curated asset which attains a highest curation score for a particular timeframe (e.g., a day, a week, a month, a year) may be selected as the key asset to represent that timeframe.

In another example, a threshold curation score may be determined, and this threshold curation score may be compared to curation scores calculated for curated assets for a particular timeframe (e.g., a day, a week, a month, a year). The threshold curation score may be dynamically determined to only select a certain percentage of assets to be key assets (e.g., a top 10%, 5%, 2%, 1%, 0.5%, etc.). All curated assets that have a curation score greater than or equal to the threshold curation score may be considered a key asset for the particular timeframe (e.g., a day, a week, a month, a year) in this approach.

Figure 12:
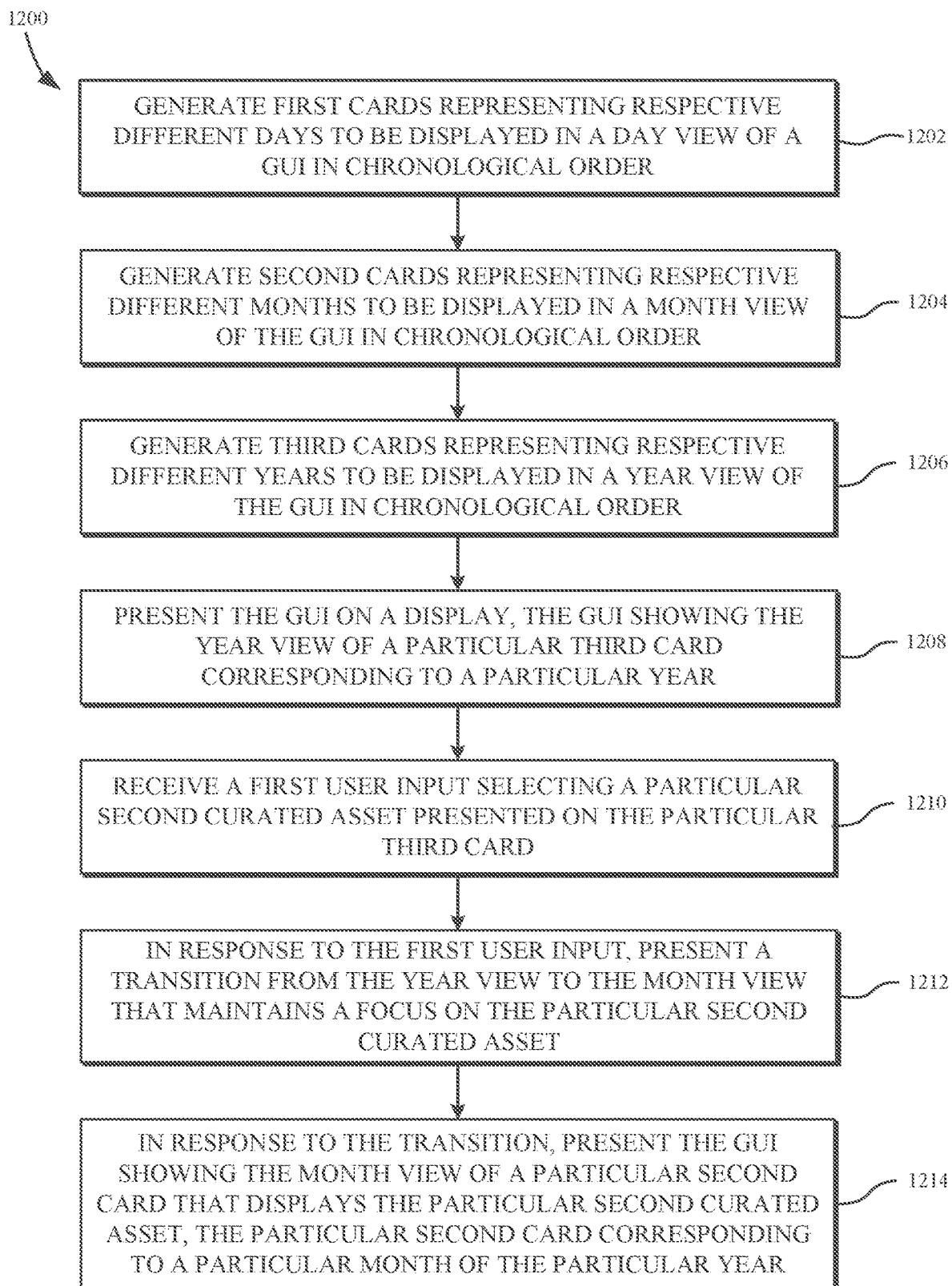
FIG. 12 is a flow diagram of an example process for selecting and displaying assets of a media library.

FIG. 12 is a flow diagram of an example process 1200 for selecting and displaying assets of a media library. Assets of a media library may be selected and displayed using method 1200 for any of the example views described in FIGS. 2-6B. In an approach, example assets that may be included in the media library include, but are not limited to, still images, videos, animated images, composite presentations, panoramic images, etc.

Referring again to FIG. 12, in operation 1202, a computing device may generate first cards (e.g., day cards, aggregation cards). Each first card may represent a respective different day or aggregation of days to be displayed in a day view of a GUI in chronological order. In one example, a day view may include multiple day cards for a single day in response to multiple types of events being captured on the same day. In this example, assets captured at a user's work location, assets captured at a user's home location, assets captured during a trip outside of a user's locale area, and assets captured for any other events may be displayed on separate cards for the same day in which they are captured. Other event types may be used to determine how to separate assets captured in a same day as would be apparent to one of skill in the art upon reading the present disclosures.

Moreover, each day card may include first curated assets (e.g., filtered assets) from a media library that has many assets, with each first card representing a respective single day or an aggregation of consecutive days. The filtered assets may be derived from a curation process, such as example process 1000 shown in FIG. 10.

An aggregation of days may be shown on a day card in day view when the assets are captured during a trip over several days, or there are insufficient assets available for display for one or more days in the aggregation of days.

In one approach, filtered assets do not include duplicate images and videos, junk assets (blurry, unrecognizable content, pocket photos, low light, washed out, etc.), and utility assets, as described in more detail previously. The filtered assets are those assets of the media library that remain after filtering out undesired assets.

Returning to FIG. 12, in operation 1204, the computing device may generate second cards (month cards) representing respective different months to be displayed in a month view of the GUI in chronological order. Each month card may include second curated assets (key assets) selected from one of the day cards that represents a day or an aggregation of consecutive days in a corresponding month. The key assets may be derived from a curation process, such as example process 1100 shown in FIG. 11.

Returning to FIG. 12, in operation 1206, the computing device may generate third cards (year cards) representing respective different years to be displayed in a year view of the GUI in chronological order. Each year card may include one or more key assets selected from one of the month cards that represents a month in a corresponding year. The represented month in the corresponding year may be selected to be nearest to a current month, so that each time a user views the year view, the image(s), video(s), or other asset(s) that are shown relate to the current date, and may change daily to keep the interface looking fresh for the user.

In operation 1208, the GUI may be presented on a display of the computing device. The GUI may show any of the particular views, and in one example, the GUI may show the year view of a particular year card corresponding to a particular year.

In operation 1210, a first user input selecting a particular key asset presented on the particular year card may be received by the computing device. This first user input may be direct selection of the particular key asset, or an inferred selection of the key asset based on a position of the key asset in the GUI when a different label is selected to direct the GUI to change views.

In operation 1212, in response to the first user input, the computing device may present a transition from the year view to the month view while maintaining a focus on the particular key asset. Keeping a focus of the current view on the selected key asset includes displaying the key asset after the transition to the next view, and/or showing a grouping of assets that includes the selected key asset after the transition (even if the selected key asset is not shown in the GUI, but is accessible through selection of one of the assets shown from the grouping).

In operation 1214, in response to the transition, the computing device presents the GUI showing the month view of a particular month card that displays the particular key asset (or at least represents a time frame when the particular key asset was captured). The particular month card corresponds to a particular month of the particular year.

In another approach, a video may be automatically played (e.g., in a loop or only one or two times) in response to the video being displayed in the GUI. In this way, every time a view of the GUI includes a video, the video is automatically played to provide interest in the view, instead of simply presenting a still image taken from the video.

Similarly, in an approach, an animated image may be automatically played (e.g., in a loop or only one or two times) in response to the animated image being displayed in the GUI. In this way, every time a view of the GUI includes an animated image, the animated image is automatically played to provide interest in the view, instead of simply presenting a still image taken from the animated image.

In one example, the GUI may include a ribbon element that includes one or more labels to other views available in the GUI. For example, the ribbon element may include labels to an all assets view, a month view, a year view, and a day view. Each label, when selected, causes the GUI to show a particular card associated with the label in an appropriate view to the GUI, e.g., month cards are shown in month view, day cards are shown in day view, etc. The ribbon element may be selectively positioned along a top, a bottom, or one of the sides of the GUI, it may auto-hide from view when not in use, and it may have a transparent background, an opaque background, or a semi-transparent background. Moreover, the various labels may include textual descriptors, graphics, or a combination of a graphic and text to distinguish what the label represents.

In one example, the first user input may be selection of one of the labels in the ribbon element.

In another example, the plurality of assets of the media library may be filtered to produce the first curated assets (e.g., filtered assets). This filtering of assets in the media library may cause removal of duplicate assets, assets of poor quality, and assets having a utility purpose in an approach.

To determine which assets to show in some of the views (e.g., year view, month view) and which assets to show larger in some of the views (e.g., year view, month view, day view), curation scores may be determined for the filtered assets (e.g., the first curated assets left after filtering out junk, duplicates, and utility assets). In another approach, key assets (e.g., second curated assets) may be determined based on curation scores of the plurality of filtered assets.

A curation score for a particular asset may be based on one or more of the following factors: a global aesthetic, a number of shares for the particular asset, a number of views for the particular asset, a number of persons identified in the particular asset, a size of a grouping of assets that includes the particular asset, and an imputed meaning for the particular asset. These factors may be combined together to form an overall curation score for a particular asset with equal weighting, or according to a weighting scheme which causes one or more of the (high-weighted) factors to influence the overall curation score more than other (low-weighted) factors.

In another approach, key assets for the month and year views may be determined based on behavioral curation of the assets in the media library. In this approach, past behavior of a user of the media library may be used to determine preferences of the user for managing assets of the media library, determining which assets to display more prominently (e.g., larger than other assets on a card), which assets to demote from most views (e.g., filter out from year, month, and day views), etc.

In an additional approach, relationship information for the user may be used in determining which assets are more likely to be viewed favorably by the user. Relationship information may be used to determine who persons that are identified in photos and videos are to the user, for example, mother, father, sister, brother, child, etc. Assets which include family members may be more important to the user than images that do not include family. Similarly, friends may be determined from photos and videos based on a frequency of the person appearing in assets of the media library, how the user treats assets with a particular person in it (e.g., multiple views, multiple shares with one or more contacts who may be the person in the asset, etc.).

In another approach, a knowledge graph may be used to help determine key assets for the media library. The knowledge graph may correlate assets and metadata associated with the assets in the media library with the user, stored data and metadata for contacts of the user, relationship information for the user, locations, timeframes, and other information available to determine connections between data.

A knowledge graph metadata network associated with the assets stored to the media library may be generated. The metadata network may comprise correlated metadata assets describing characteristics associated with the assets of the media library. Each metadata asset may describe a characteristic associated with one or more assets in the media library. In a non-limiting example, a metadata asset may describe a characteristic associated with multiple images and/or videos in the media library. Each metadata asset may be represented as a node in the metadata network, and may be correlated with at least one other metadata asset (node).

Each correlation between metadata assets may be represented as an edge in the metadata network that is positioned between the nodes representing the correlated metadata assets. By using such a vast knowledge graph metadata network to describe the connections between assets, the user, contacts of the user, locations, timeframes, etc., key assets may be more carefully determined that represent images and people that a user would want to see more prominently in the media library and that may be used to locate timeframes to search for other assets in lower levels of the media library.

For example, a photo of a group of people may not be aesthetically pleasing with respect to the global aesthetic, but it may be commonly viewed by the user, put on wallpaper of a laptop by the user, and sent via text message to a group of contacts who are recognized as being in the photo. This photo, even if it does not have a high curation score may ultimately be considered a key asset based on the behavior of the user with respect to the photo, and may be prominently displayed on cards for timeframes in which the photo was captured because it is a key asset.

In an approach, the GUI may be presented showing the day view of a particular day card (in response to user input selecting a day view). A size of at least one filtered asset displayed in the particular day card may be larger than other filtered assets displayed in the particular day card based on the curation score of the at least one filtered asset. In other words, a filtered asset that is chosen to be a key asset may be shown larger than other filtered assets for a particular day.

In this approach, second user input selecting a filtered asset displayed to the particular day card may be received by the computing device. In response to receiving the second user input, the computing device may present a transition from the day view to an all assets view that maintains a focus on the filtered asset. Also, in response to the transition, the computing device may present the GUI showing the all assets view of a portion of the plurality of assets of the media library sorted chronologically to allow a user to easily navigate through levels of the media library in an intuitive manner. In this view, sizes of all assets currently displayed in the GUI may be substantially equal. The user may navigate through this view to access all assets stored to the media library, regardless of the content and quality of the asset (e.g., the assets are unfiltered).

According to an example, the particular month card may be limited to displaying up to five key assets selected from different weeks of a particular month that is represented by the particular month card. Each key asset displayed in the month card may be selected based on curation scores of filtered assets for day cards that represent days in the particular month. In this example, second user input selecting a certain key asset displayed to the month card may be received, and in response to the second user input, the computing device may present a transition from the month view to the day view that maintains a focus on the certain key asset. Thereafter, in response to the transition, the computing device may present the GUI showing the day view of a particular day card which includes the certain key asset to allow a user to easily navigate through levels of the media library in an intuitive manner.

In one approach, each key asset displayed in the particular year card may be selected based on one or more factors. The factors may include, but are not limited to, curation scores of key assets for month cards that represent months in the particular year represented by the particular year card, and a similarity between a current date and a timestamp of the key assets for the month cards that represent the months in the particular year.

Figure 13:
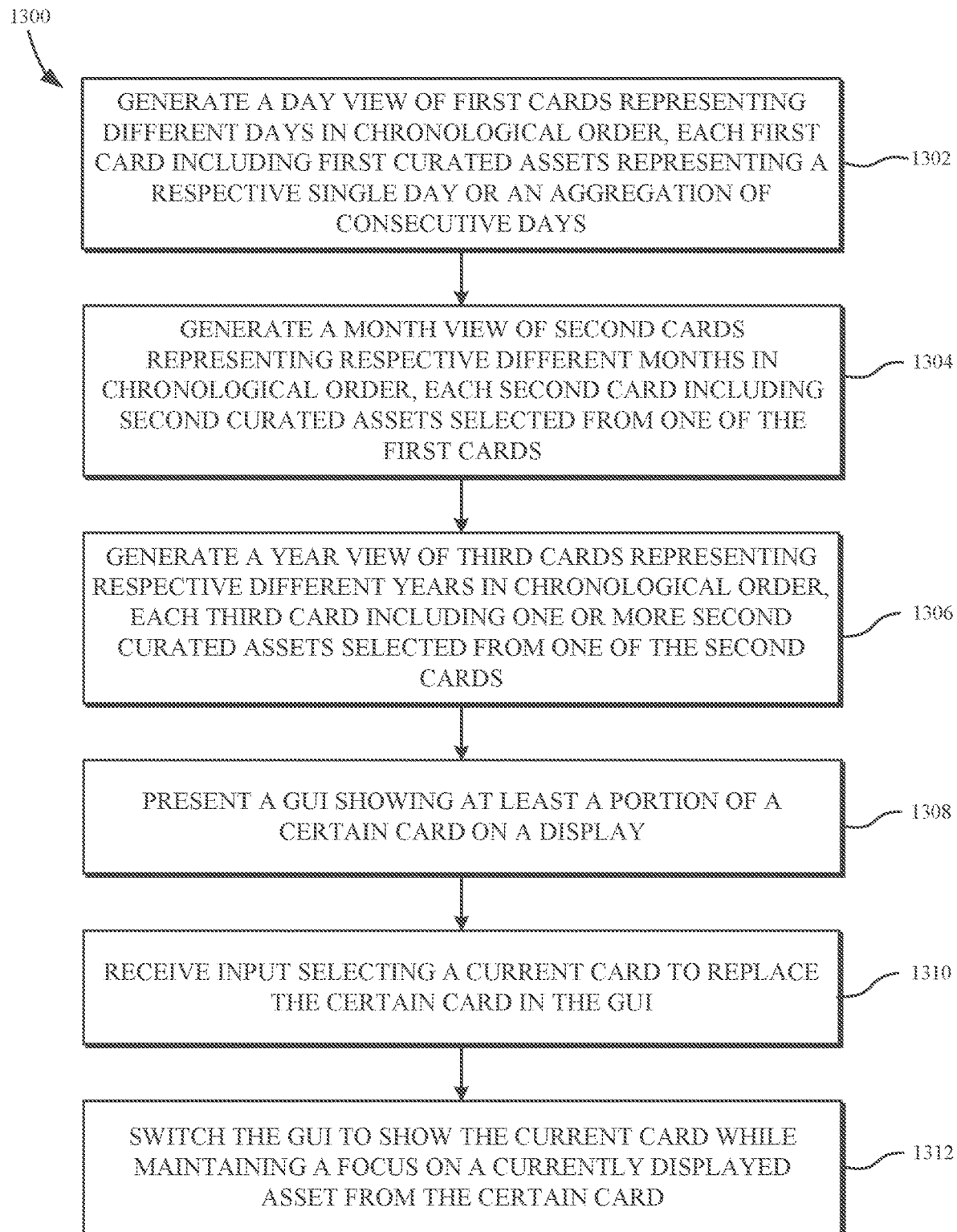
FIG. 13 is a flow diagram of an example process for selecting and displaying assets of a media library.

FIG. 13 is a flow diagram of an example process 1300 for selecting and displaying assets of a media library. Assets of a media library may be selected and displayed using method 1300 for any of the example views described in FIGS. 2-6B. In an approach, example assets that may be included in the media library include, but are not limited to, still images, videos, animated images, composite presentations, panoramic images, etc.

Referring again to FIG. 13, in operation 1302, a computing device may generate a day view of first cards (e.g., day cards and/or aggregation cards) to be displayed in a GUI in chronological order. Each day card may include first curated assets (e.g., filtered assets) representing a respective single day or aggregation of consecutive days. In one example, a day view may include multiple day cards for a single day in response to multiple types of events being captured on the same day.

In this example, filtered assets captured at a user's work location, filtered assets captured at a user's home location, filtered assets captured during a trip outside of a user's locale area, and filtered assets captured for other event types (dinners, parties, etc.) may be displayed on separate day cards for the same day (the day in which they are captured). Other event types may also be used in determining how to separate filtered assets captured in a same day, as would be apparent to one of skill in the art upon reading the present disclosures.

Moreover, the filtered assets may be derived from a curation process, such as example process 1000 shown in FIG. 10.

An aggregation of filtered assets from multiple consecutive days may be shown on an aggregation card in day view when the filtered assets are captured during a trip over several days, or there are insufficient assets available for display for one or more days in the aggregation of days.

In one approach, filtered assets do not include duplicate images and videos, junk assets (blurry, unrecognizable content, pocket photos, low light, washed out, etc.), and utility assets, as described in more detail previously. The filtered assets are those assets of the media library that remain after filtering out undesired assets.

Returning to FIG. 13, in operation 1304, the computing device may generate a month view of second cards (month cards) representing respective different months to be displayed in the GUI in chronological order. Each month card may include second curated assets (key assets) selected from one of the day cards that represents a day or an aggregation of consecutive days in a corresponding month. The key assets may be derived from a curation process, such as example process 1100 shown in FIG. 11.

Returning to FIG. 13, in operation 1306, the computing device may generate a year view of third cards (year cards) representing respective different years to be displayed in the GUI in chronological order. Each year card may include one or more key assets selected from one of the month cards that represents a month in a corresponding year. The represented month in the corresponding year may be selected to be nearest to a current month, so that each time a user views the year view, the image(s), video(s), or other asset(s) that are shown relate to the current date, and may change daily to keep the interface looking fresh for the user.

In operation 1308, the GUI showing at least a portion of a certain card (e.g., a day card, aggregation card, month card, or year card) may be presented in a corresponding view (day view, month view, or year view) on a display of the computing device. The GUI may show a portion, an entirety, or multiple cards of any one type.

In operation 1310, input selecting a current card to replace the certain card already displayed to the GUI may be received by the computing device. This input may be direct selection of a particular asset displayed to the certain card, or an inferred selection of the particular asset based on a position of the key asset in the GUI when a different label is selected to direct the GUI to change views.

In operation 1312, in response to the input, the computing device may switch the GUI to show the current card while maintaining a focus on the particular asset from the certain card. Keeping a focus of the current card on the particular asset includes displaying the particular asset after the transition to the current card, and/or showing a grouping of assets that includes the particular asset after the transition (even if the particular asset is not shown in the GUI, but is accessible through selection of one of the assets shown from the grouping).

In one approach, a video may be played (e.g., in a loop or only one or two times) in response to the video being displayed in the GUI. In this way, every time a view of the GUI includes a video, the video is automatically played to provide interest in the view, instead of simply presenting a still image taken from the video.

Similarly, in an approach, an animated image may be played (e.g., in a loop or only one or two times) in response to the animated image being displayed in the GUI. In this way, every time a view of the GUI includes an animated image, the animated image is automatically played to provide interest in the view, instead of simply presenting a still image taken from the animated image.

In one example, the GUI may include a ribbon element that includes one or more labels to other views available in the GUI. For example, the ribbon element may include labels to an all assets view, a month view, a year view, and a day view. Each label, when selected, causes the GUI to show a particular card associated with the label in an appropriate view to the GUI, e.g., month cards are shown in month view, day cards are shown in day view, etc. The ribbon element may be selectively positioned along a top, a bottom, or one of the sides of the GUI, it may auto-hide from view when not in use, and it may have a transparent background, an opaque background, or a semi-transparent background. Moreover, the various labels may include textual descriptors, graphics, or a combination of a graphic and text to distinguish what the label represents.

In one example, the input may be selection of one of the labels in the ribbon element that causes the GUI to display a card that corresponds to the view of the selected label representing one or more assets from a time frame relevant to the current card.

To determine which assets to show in some of the views (e.g., year view, month view) and which assets to show larger in some of the views (e.g., year view, month view, day view), curation scores may be determined for the filtered assets (e.g., the first curated assets left after filtering out junk, duplicates, and utility assets). In another approach, key assets (e.g., second curated assets) may be determined based on curation scores of the plurality of filtered assets.

Any method or technique for determining key assets to display to the month and year view may be used, as described herein, or known to those of skill in the art.

In an approach, the current card may be a particular day card, where a size of at least one filtered asset displayed in the particular day card is larger than other filtered assets displayed in the particular day card based on a curation score of the filtered assets. Assets which achieve higher curations scores may be considered key assets in some approaches, and displayed more prominently in on their respective day cards.

In response to receiving input selecting a filtered asset displayed to the particular day card, the computing device may display a portion of all of the assets of the media library, sorted chronologically, while maintaining a focus on the selected filtered asset in the display area, wherein sizes of the portion of the plurality of assets displayed in the display area are substantially equal.

In another approach, the current card may be a particular month card displaying at least one key asset from the corresponding month. The key asset(s) shown on the month card may be selected based on curation scores of all filtered assets in the corresponding month, with highest scoring filtered assets being key assets that may be selected for display in one example.

In response to receiving input selecting a key asset displayed to the particular month card, the computing device may display a particular day card that shows the selected key asset on the day card.

In one approach, month cards may be limited to displaying up to five key assets, one for each calendar week of the corresponding month.

In another example, the current card may be a particular year card displaying one or more particular key assets from months of the corresponding year. The key assets displayed may be selected based on curation scores of key assets for month cards that represent months in the corresponding year represented by the particular year card. The key assets displayed may further be selected based on a similarity between a current date and a timestamp of the key assets that represent the months in the corresponding year. For example, if the current month is April, the key asset(s) chosen for a year card for 2011 may be selected from key assets from the month of April 2011.

In a further approach, in response to receiving input selecting a certain key asset displayed to the particular year card, the computing device ay display a particular month card that comprises the certain key asset in the GUI.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to select and display on a GUI assets from a media library that may be of interest to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to select images, videos, and other assets from the media library that will be of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, for asset selection and display from the media library, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images, videos, and other assets of a media library may be selected and displayed to a user by inferring preferences based on non-personal information data or a bare minimum amount of personal information, such as the content being requested by the device associated with a user, other non-personal information available to the media library application, or publicly available information.

Example System Architecture

Figure 14:
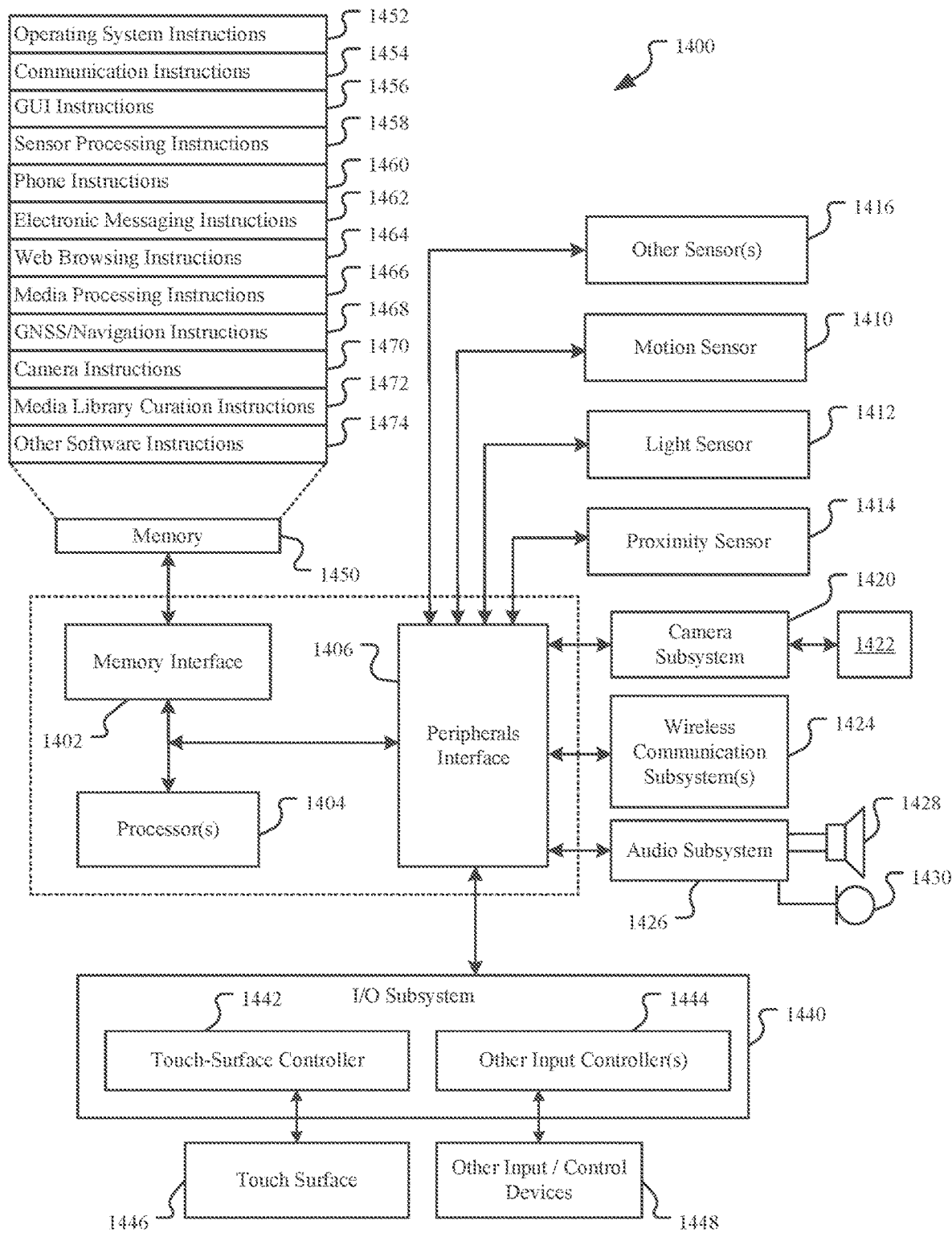
FIG. 14 is a block diagram of an example computing device that may implement the features and processes of FIGS. 1-13.

FIG. 14 is a block diagram of an example computing device 1400 that can implement the features and processes of FIGS. 1-13. The computing device 1400 can include a memory interface 1402, one or more data processors, image processors and/or central processing units 1404, and a peripherals interface 1406. The memory interface 1402, the one or more processors 1404 and/or the peripherals interface 1406 can be separate components or can be integrated in one or more integrated circuits. The various components in the computing device 1400 can be coupled by one or more communication buses or signal lines.

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate orientation, lighting, and proximity functions. Other sensors 1416 can also be connected to the peripherals interface 1406, such as a global navigation satellite system (GNSS) (e.g., GPS receiver), a temperature sensor, a biometric sensor, magnetometer or other sensing device, to facilitate related functionalities.

A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips. The camera subsystem 1420 and the optical sensor 1422 can be used to collect images of a user to be used during authentication of a user, e.g., by performing facial recognition analysis.

Communication functions can be facilitated through one or more wireless communication subsystems 1424, which can include radio frequency receivers and transmitters and/or optical (e.g., infrared) receivers and transmitters. The specific design and implementation of the communication subsystem 1424 can depend on the communication network (s) over which the computing device 1400 is intended to operate. For example, the computing device 1400 can include communication subsystems 1424 designed to operate over a GSM network, a GPRS network, an EDGE network, a Wi-Fi or WiMax network, and a Bluetooth™ network. In particular, the wireless communication subsystems 1424 can include hosting protocols such that the device 100 can be configured as a base station for other wireless devices.

An audio subsystem 1426 can be coupled to a speaker 1428 and a microphone 1430 to facilitate voice-enabled functions, such as speaker recognition, voice replication, digital recording, and telephony functions. The audio subsystem 1426 can be configured to facilitate processing voice commands, voiceprinting and voice authentication, for example.

The I/O subsystem 1440 can include a touch-surface controller 1442 and/or other input controller(s) 1444. The touch-surface controller 1442 can be coupled to a touch surface 1446. The touch surface 1446 and touch-surface controller 1442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1446.

The other input controller(s) 1444 can be coupled to other input/control devices 1448, such as one or more buttons, rocker switches, thumb-wheel, infrared port, USB port, and/or a pointer device such as a stylus. The one or more buttons (not shown) can include an up/down button for volume control of the speaker 1428 and/or the microphone 1430.

In one implementation, a pressing of the button for a first duration can disengage a lock of the touch surface 1446; and a pressing of the button for a second duration that is longer than the first duration can turn power to the computing device 1400 on or off. Pressing the button for a third duration can activate a voice control, or voice command, module that enables the user to speak commands into the microphone 1430 to cause the device to execute the spoken command. The user can customize a functionality of one or more of the buttons. The touch surface 1446 can, for example, also be used to implement virtual or soft buttons and/or a keyboard.

In some implementations, the computing device 1400 can present recorded audio and/or video files, such as MP3, AAC, and MPEG files. In some implementations, the computing device 1400 can include the functionality of an MP3 player, such as an iPod™.

The memory interface 1402 can be coupled to memory 1450. The memory 1450 can include high-speed random-access memory and/or non-volatile memory, such as one or more magnetic disk storage devices, one or more optical storage devices, and/or flash memory (e.g., NAND, NOR). The memory 1450 can store an operating system 1452, such as Darwin, RTXC, LINUX, UNIX, OS X, WINDOWS, or an embedded operating system such as VxWorks.

The operating system 1452 can include instructions for handling basic system services and for performing hardware dependent tasks. In some implementations, the operating system 1452 can be a kernel (e.g., UNIX kernel). In some implementations, the operating system 1452 can include instructions for performing voice authentication. For example, operating system 1452 can implement the curation of assets in a media library as described with reference to FIGS. 1-13.

The memory 1450 can also store communication instructions 1454 to facilitate communicating with one or more additional devices, one or more computers and/or one or more servers. The memory 1450 can include graphical user interface instructions 1456 to facilitate graphic user interface processing; sensor processing instructions 1458 to facilitate sensor-related processing and functions; phone instructions 1460 to facilitate phone-related processes and functions; electronic messaging instructions 1462 to facilitate electronic-messaging related processes and functions; web browsing instructions 1464 to facilitate web browsing-related processes and functions; media processing instructions 1466 to facilitate media processing-related processes and functions; GNSS/Navigation instructions 1468 to facilitate GNSS and navigation-related processes and instructions; and/or camera instructions 1470 to facilitate camera-related processes and functions.

The memory 1450 can store software instructions 1472 to facilitate other processes and functions, such as the media library curation processes and functions as described with reference to FIGS. 1-13.

The memory 1450 can also store other software instructions 1474, such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions of the computing device 1400 can be implemented in hardware and/or in software, including in one or more signal processing and/or application specific integrated circuits.

What is claimed is:

1. A method, comprising:
generating, by a computing device, first cards representing respective different days in chronological order to be displayed in a day view of a graphical user interface (GUI), each first card comprising first curated assets representing a respective single day or an aggregation of consecutive days, the first curated assets being selected from a media library comprising a plurality of assets;
generating, by the computing device, second cards representing respective different months in chronological order to be displayed in a month view of the GUI, each second card comprising second curated assets selected from one of the first cards that represents a day or an aggregation of consecutive days in a corresponding month;
generating, by the computing device, third cards representing respective different years in chronological order to be displayed in a year view of the GUI, each third card comprising one or more second curated assets selected from one of the second cards that represents a month in a corresponding year, the represented month in the corresponding year being nearest to a current month;
presenting, by the computing device, the GUI showing the year view of a particular third card corresponding to a particular year on a display of the computing device;
receiving, by the computing device, a first user input selecting a particular second curated asset presented on the particular third card;
in response to the first user input, presenting, by the computing device, a transition from the year view to the month view that maintains a focus on the particular second curated asset;
in response to the transition, presenting, by the computing device, the GUI showing the month view of a particular second card that displays the particular second curated asset, the particular second card corresponding to a particular month of the particular year;
receiving, by the computing device, second user input selecting a certain second curated asset displayed to the particular second card;
in response to the second user input, presenting, by the computing device, a transition from the month view to the day view that maintains a focus on the certain second curated asset; and
in response to the transition, presenting, by the computing device, the GUI showing the day view of a particular first card comprising the certain second curated asset,
wherein the particular second card is limited to displaying no more than five second curated assets selected from different weeks of the particular month represented by the particular second card, and
wherein each second curated asset displayed in the particular second card is selected based on curation scores of first curated assets for first cards that represent days in the particular month.

2. The method as recited in claim 1, wherein the plurality of assets of the media library are selected from a group consisting of: still images, videos, animated images, composite presentations, and panoramic images, the method further comprising: playing a video in a loop in response to the video being displayed in the GUI; and playing an animated image in a loop in response to the animated image being displayed in the GUI.

3. The method as recited in claim 1, wherein the year view is presented exclusive of the month view and the day view, wherein the month view is presented exclusive of the year view and the day view, and wherein the day view is presented exclusive of the year view and the month view.

4. The method as recited in claim 1, wherein the GUI further comprises:
a ribbon element, positioned along a top or a bottom of the GUI, comprising a plurality of selectable links, each link being associated with a different type of card, and wherein the first user input selecting the particular second curated asset presented on the particular third card comprises receiving input selecting a particular link of the plurality of selectable links with the particular second curated asset being the focus of the GUI.

5. The method as recited in claim 1, further comprising: filtering the plurality of assets of the media library to produce the first curated assets, the filtering comprising removing duplicate assets, assets of poor quality, and assets having a utility purpose.

6. The method as recited in claim 1, further comprising determining the curation scores for the first curated assets, wherein a curation score for a particular asset is based on a global aesthetic, a number of shares for the particular asset, a number of views for the particular asset, a number of persons identified in the particular asset, a size of a grouping of assets that includes the particular asset, and an imputed meaning for the particular asset.

7. The method as recited in claim 6, further comprising:
presenting, by the computing device, the GUI showing the day view of a particular first card, wherein a size of at least one first curated asset displayed in the particular first card is larger than other first curated assets displayed in the particular first card based on a curation score of the at least one first curated asset;
receiving, by the computing device, second user input selecting a particular first curated asset displayed to the particular first card;
in response to receiving the second user input, presenting, by the computing device, a transition from the day view to an all assets view that maintains a focus on the particular first curated asset; and
in response to the transition, presenting, by the computing device, the GUI showing the all assets view of a portion of the plurality of assets of the media library sorted chronologically, wherein sizes of the portion of the plurality of assets displayed in the GUI are substantially equal.

8. The method as recited in claim 1, wherein each second curated asset displayed in the particular third card is selected based on:
curation scores of second curated assets for second cards that represent months in the particular year represented by the particular third card; and
a similarity between a current date and a timestamp of the second curated assets for the second cards that represent the months in the particular year.

9. A system comprising:
one or more processors; and
a non-transitory computer-readable medium including one or more sequences of instructions that, when executed by the one or more processors, cause the one or more processors to perform operations comprising:
generating a day view of first cards representing different days in chronological order, each first card comprising first curated assets representing a respective single day or an aggregation of consecutive days, the first curated assets being selected from a media library comprising a plurality of assets;
generating a month view of second cards representing respective different months in chronological order, each second card comprising second curated assets selected from one of the first cards representing a day or an aggregation of consecutive days in a corresponding month;
generating a year view of third cards representing respective different years in chronological order, each third card comprising one or more second curated assets selected from one of the second cards that represents a month in a corresponding year, the represented month in the corresponding year being nearest to a current month;
presenting a graphical user interface (GUI) showing at least a portion of a certain card on a display of the system, the certain card being one of the first cards, the second cards, or the third cards;
receiving input selecting a current card to replace the certain card in the GUI;
switching the GUI to show the current card while maintaining a focus on a currently displayed asset from the certain card, wherein the current card is a particular second card displaying at least one second curated asset, wherein the at least one second curated asset displayed in the particular second card is selected for display based on curation scores of first curated assets for first cards that represent days in a month represented by the particular second card;
receiving input selecting a second curated asset displayed to the particular second card; and
in response to receiving the input, displaying a particular first card comprising the selected second curated asset in the GUI,
wherein the particular second card is limited to displaying no more than five second curated assets, and
wherein each of the second curated assets displayed in the particular second card is selected from a different week of the month represented by the particular second card.

10. The system as recited in claim 9, wherein the plurality of assets of the media library are selected from a group consisting of: still images, videos, animated images, composite presentations, and panoramic images, and wherein the operations further comprise determining, absent user input selecting the currently displayed asset, that an asset located near a center of all assets displayed on the certain card is the focus of the certain card and is designated as the currently displayed asset.

11. The system as recited in claim 9, wherein the GUI further comprises:
a ribbon element, positioned along a top or a bottom of the GUI, comprising a plurality of selectable links, each link being associated with a different type of card, and wherein the operations further comprise:
in response to receiving input selecting a particular link of the plurality of selectable links, switching the current card to a card associated with the particular link, the associated card representing one or more assets from a time frame relevant to the current card.

12. The system as recited in claim 9, wherein the year view is presented exclusive of the month view and the day view, wherein the month view is presented exclusive of the year view and the day view, and wherein the day view is presented exclusive of the year view and the month view.

13. The system as recited in claim 9, wherein the operations further comprise:
filtering the plurality of assets of the media library to produce the first curated assets, the filtering comprising removing duplicate assets, assets of poor quality, and assets having a utility purpose.

14. The system as recited in claim 9, wherein the operations further comprise determining the curation scores for the first curated assets, wherein a curation score for a particular asset is based on a global aesthetic, a number of shares for the particular asset, a number of views for the particular asset, a number of persons identified in the particular asset, a size of a grouping of assets that includes the particular asset, and an imputed meaning for the particular asset.

15. The system as recited in claim 14, wherein the current card is a particular first card, wherein a size of at least one first curated asset displayed in the particular first card is larger than other first curated assets displayed in the particular first card based on a curation score of the at least one first curated asset, and wherein the operations further comprise: receiving input selecting a first curated asset displayed to the particular first card; and in response to receiving the input, displaying a portion of the plurality of assets of the media library sorted chronologically while maintaining a focus on the selected first curated asset in the GUI, wherein sizes of the portion of the plurality of assets displayed in the GUI are substantially equal.

16. The system as recited in claim 9, wherein the current card is a particular third card displaying one or more particular second curated assets, wherein the one or more particular second curated assets displayed in the particular third card is selected based on:

curation scores of second curated assets for second cards that represent months in a year represented by the particular third card; and a similarity between a current date and a timestamp of the second curated assets for the second cards that represent the months in the year represented by the particular third card, and wherein the operations further comprise:

receiving input selecting a certain second curated asset displayed to the particular third card; and in response to receiving the input, displaying a particular second card that comprises the certain second curated asset in the GUI.

\* \* \* \* \*